United States Patent
Farmer et al.

(10) Patent No.: US 10,126,138 B1
(45) Date of Patent: *Nov. 13, 2018

(54) DYNAMIC GEOLOCATION OPTIMIZATION OF PICKUP PATHS USING CURB SEGMENT DATA

(71) Applicant: Lyft, Inc., San Francisco, CA (US)

(72) Inventors: Rob Farmer, San Francisco, CA (US); Snir Kodesh, San Francisco, CA (US); Matthew Ezra Leventi, Seattle, WA (US)

(73) Assignee: LYFT, INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/671,089

(22) Filed: Aug. 7, 2017

Related U.S. Application Data

(60) Provisional application No. 62/504,432, filed on May 10, 2017.

(51) Int. Cl.
  *G01C 21/34* (2006.01)
  *G06Q 50/30* (2012.01)
  *G06F 17/30* (2006.01)

(52) U.S. Cl.
  CPC ..... *G01C 21/3438* (2013.01); *G06F 17/3087* (2013.01); *G06F 17/30241* (2013.01); *G06Q 50/30* (2013.01)

(58) Field of Classification Search
  CPC ............. G01C 21/3438; G06F 17/3087; G06F 17/30241; G06Q 50/30
  See application file for complete search history.

(56) References Cited

U.S. PATENT DOCUMENTS

| | | |
|---|---|---|
| 2013/0132140 A1 | 5/2013 | Amin et al. |
| 2015/0377635 A1 | 12/2015 | Beaurepaire et al. |
| 2016/0034828 A1 | 2/2016 | Sarawgi et al. |
| 2016/0247113 A1 | 8/2016 | Rademaker |
| 2017/0169535 A1 * | 6/2017 | Tolkin .............. G06Q 10/06311 |
| 2017/0344010 A1 * | 11/2017 | Rander .............. G01C 21/3438 |

OTHER PUBLICATIONS

U.S. Appl. No. 15/671,108, dated Jan. 24, 2018, Office Action.
Hai Yang et al., "Equilibria of bilateral taxi-customer searching and meeting on networks meeting on networks," Transportation Research Part B. vol. 44, 2010, pp. 1067-1083. See pp. 1068-1070 and figure 1.
International Search Report & Written Opinion as received in PCT/US2018/032163, dated Aug. 29,2018.
U.S. Appl. No. 15/671,108, dated Aug. 7, 2018, Office Action.

* cited by examiner

*Primary Examiner* — Yuen H Wong
(74) *Attorney, Agent, or Firm* — Keller Jolley Preece

(57) ABSTRACT

Embodiments provide techniques, including systems and methods, for determining curb segments within a threshold boundary of a transport request location, which when evaluated with respect to travel time, among other factors, result in travel efficiencies over the original transport request location. For example, a curb identification system uses building perimeter edges and road parameters to determine curb segments, which are stored as curb segment data. The curb segment data is used to identify alternate request locations corresponding to an original request location, such as being with a radius or boundary. A time for a requestor to travel from the original request location to the alternate request location is evaluated with regard to travel time.

20 Claims, 20 Drawing Sheets

DYNAMIC GEOLOCATION OPTIMIZATION OF PICKUP PATHS USING CURB SEGMENT DATA

CROSS-REFERENCE TO RELATED APPLICATIONS

This application claims priority to provisional application U.S. Provisional Application No. 62/504,432, filed May 10, 2017, entitled "DYNAMIC GEOLOCATION OPTIMIZATION OF PICKUP PATHS USING CURB SEGMENT DATA," which is hereby expressly incorporated herein by reference in its entirety.

BACKGROUND

Traditionally, people have requested and received services at fixed locations from specific service providers. For example, various services were fulfilled by making a delivery to a user at a home or work location. Many services can now be accessed through mobile computing devices and fulfilled at arbitrary locations, often by service providers that are activated on demand. Such on-demand service offerings are convenient for users, who do not have to be at fixed locations to receive the services. Additionally, on-demand service matching systems may select and provide requests to service providers based the location and status of service providers near a request location. However, various routes generated to a request location may be suboptimal. This leads to inefficient resource allocation as longer trips lead to delay, canceled requests, and duplicated requests.

Additionally, some request locations may be more difficult for a provider to successfully locate and interface with a requestor due to traffic, obstacles, and/or the configuration of the road. For example, busy streets with parked cars on the curbs may be difficult to find a safe location for a pickup location. As such, requestors may be forced to walk around the block to find a location where it was safe for a provider to park. This can delay the pickup interaction, require unnecessary communication between the provider and requestor, and/or lead to cancelations of requests where a reasonable location cannot be found. As such, accurate travel time estimates and time of arrival estimates may be difficult to determine and unnecessary delays at the point of service may result at some request locations. This leads to inaccurate matching between providers and requestors and inefficient use of system resources as downtime by providers is increased while attempting to find requestors. Accordingly, there is a need to improve the identification of interaction locations and improve interactions between providers and requestors for overall travel time determinations, efficient use of system and processor resources, and overall improved experiences between providers and requestors.

BRIEF DESCRIPTION OF THE DRAWINGS

Various embodiments in accordance with the present disclosure will be described with reference to the drawings, in which.

DETAILED DESCRIPTION

Figure 1:
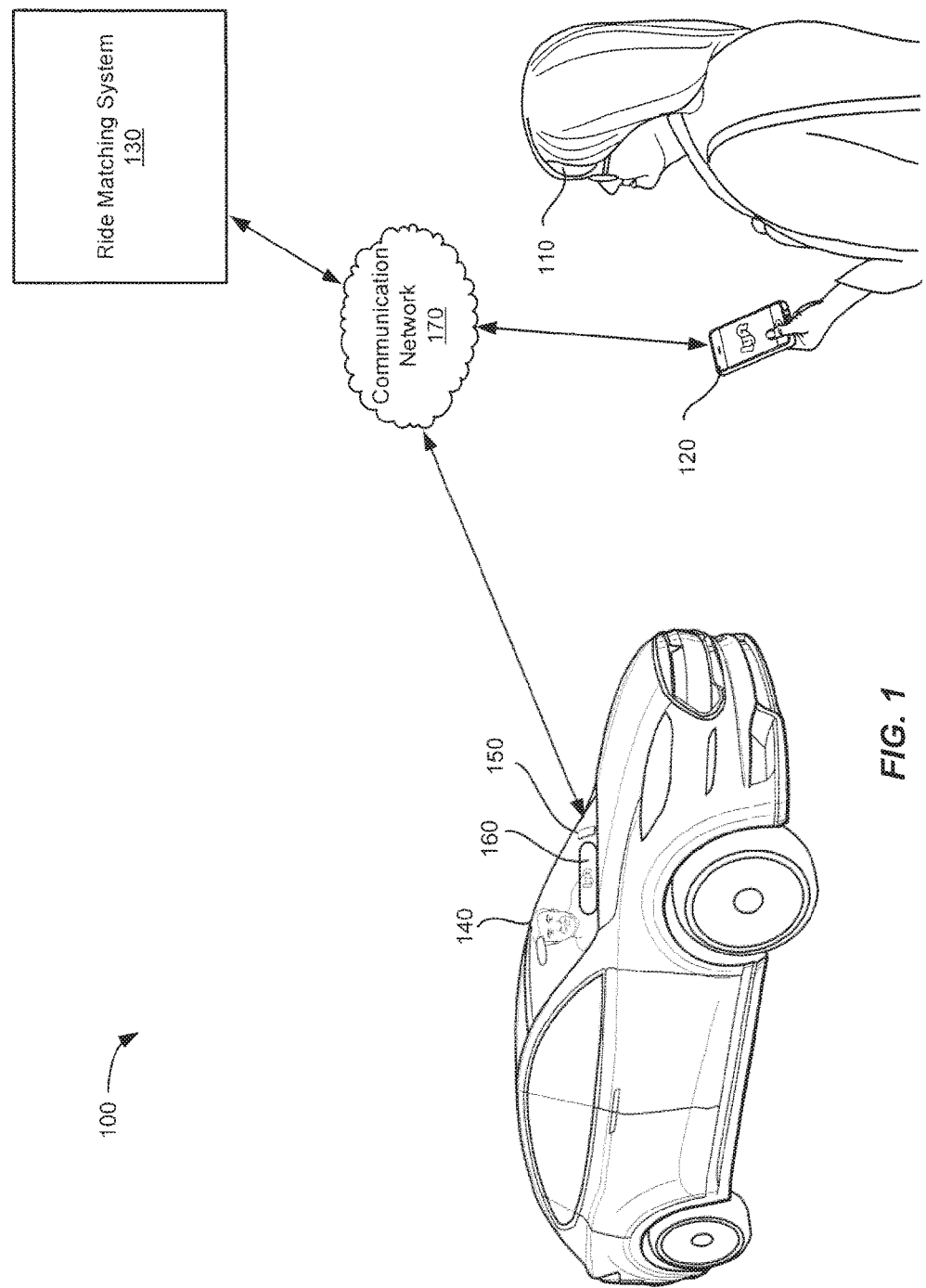
FIG. 1 illustrates an example of a ride matching system including a matched provider and requestor, in accordance with an embodiment of the present techniques.

In the following description, various embodiments are described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

On-demand services that are accessed through mobile devices are becoming more prevalent. However, due to the distributed and portable nature of providers and requestors being matched by an on-demand matching system, matching providers and requestors efficiently based on a stationary pickup point can be difficult. For example, a requestor may be in the middle of a curb segment associated with a particular street when she initiates a pickup request. In response to the pickup request, a provider is matched to the request and responds. A provider as discussed herein may include a human driver in a vehicle (fully or partially controlling the vehicle), as well as a vehicle dispatched by a human and/or an automated system. A "provider" may include, for example, an automated dynamic transportation matching system that dispatches autonomous vehicles to respond to transport requests, an autonomous or otherwise computer-controlled vehicle (in whole or in part), or a human driver. A provider, in navigating a route to the request location, may have to travel a complicated route rather than a direct route to the requestor; for example, there may be one-way streets in the layout of roads between the provider and the requestor that make the provider go around a block to reach a street providing access to the request location. In this regard, the inefficient request location adds time to the journey by making the route to the pickup location less efficient. As another example, the requestor may have specified a destination that can be reached directly along a particular road in the layout of roads, but the request location is along a curb segment that requires the provider to turn off the particular road in order to pick up the requestor before navigating back to the particular road. In this regard, the inefficient request location adds time to the journey by making the route to the destination less efficient. The present techniques improve the computer-related technology of dynamic transport matching systems and solve a technical problem of transport requests being associated with inefficient pickup locations, among other problems.

By improving the accuracy of a pickup location transmitted to both requestor and provider, the dynamic transportation matching system is improved in ways including: reducing an amount of time between a request and a pickup, which allows the system to use less processing resources. For example, while a provider has yet to "pick up" the requestor, the dynamic transportation matching system continues to perform updated estimated time of arrival (ETA) calculations, determinations of whether the provider is not going to pick up the requestor (e.g., a "bailout"), overall system ETA determinations, and supply and demand determinations, among other activities. These automated processes require the dynamic transportation matching system to use processing time, memory, bandwidth, and other system resources, which can be utilized more efficiently the faster a provider is able to pick up a requestor. Additionally, requestors are more likely to cancel a request if the provider does not arrive as soon as possible, which can lead to the requestor sending a new request that may not be fulfilled by the original provider, thus requiring twice (or more) the number of providers to service a single requestor, causing delays throughout the system, which can lead to additional cancellations and re-requests ("cascading requests" or "button mashing") from a vast number of users, each of which causes greater resource usage and inefficient resource allocation by the dynamic transportation matching system, and can in severe cases cause the dynamic transportation matching system to crash.

In both examples, a journey is made longer than it needs to be if the request location were moved to an alternate request location along a different curb segment that allows for a more efficient route to the requestor and/or a more efficient route from the request location to the destination. The potentially inefficient routes generated by previous approaches lead to the requestor being notified of longer journey times than necessary if the request location were more efficient, which can lead to cancellation of ride requests, often after a provider already has been matched to a transport request. In addition to simply cancelling a transport request, a requestor may create a new request immediately after cancelling an initial request, which may result in a similarly lengthy pickup and/or journey time, which can then lead to a cancellation and new request, etc. These cascading requests and cancellations can lead to provider downtime, as multiple providers accept the soon-to-be-cancelled transport requests in lieu of other requests. The cancelled providers may also grow frustrated with the cancellations and stop providing transport altogether in a particular area, leading to a lack to provider service in that area, potentially at a time of actual high demand.

Accordingly, inefficient request locations lead to mismanagement of provider resources as well as increased data processing and system communications as cascading requests and cancellations are sent to a transport matching system. Therefore, the techniques described herein improve the operation and efficiency of a transportation matching system, as well as the computing systems utilized as part of the transportation matching system infrastructure.

At least one embodiment provides techniques, including systems and methods, for determining alternate request locations for a request location based on a determination of curb segments, such as within a particular geographic area surrounding the request location. In an embodiment, an estimated time of arrival (ETA) to a request location is determined; for example, at a particular curb segment between a road of a layout of roads in the geographical area and one or more building perimeter edges adjacent to the road. In an embodiment, curb segment data describing a layout of curb segments in the particular geographical area, for example associated with the request location, may be determined and stored, and utilized to determine one or more of the alternate request locations. In an embodiment, each of the alternate request locations is associated with one of the curb segments within a geographical radius of the request location. In an embodiment, an estimated time of travel (ETT) is determined that indicates an estimated time it would take for the requestor to travel to one or more of the alternate request locations within a threshold distance (e.g., within the particular geographical area) of the original request location, and a determination is made whether the ETA to one of the alternate request locations, taking into account the ETT to the alternate request locations, would be less than the ETA to the original request location.

In an embodiment, an estimated time to destination (ETD) of a provider matched to a transport request is determined. The ETD may include an ETA to the request location, as described herein, or may be determined between the request location and a destination of the request, or a combination. An ETT for the requestor to move to each of a number of alternate request locations is determined; for example, how long would it take for the particular requestor to walk to the new location (e.g., taking into account various factors such as average walking rate, elevation, number of intersections to be crossed, road data, etc.). A new ETD to the destination from each of the alternate request locations is determined, taking into account the ETT, and a determination is made whether the travel to one of the alternate destination locations would save time on the journey; for example, the time taken to walk to the new request location (e.g., ETT) would be compensated for by a reduction in the time to the destination based on the new request location as compared to the original request location.

Additionally, some embodiments provide techniques, including systems and methods, for determining alternate request locations based on a pickup location score (PLoS) of a request location and/or alternate request locations. A pickup location score may include any objective quantitative measurement of the fitness of a location for an interaction between a requestor and a provider. For example, the pickup location score may characterize the roads, blocks, sub-blocks, and/or any other suitable segments of a map corresponding to locations for fitness of a pickup of a requestor by the provider at the corresponding location. As such, pickup location scores may be used to identify particularly good locations within a region, road, block, sub-block, etc. for interactions between requestors and providers. For example, there may be a fire hydrant or a no-stopping any time area that may be beneficial or may negatively impact that location for pickups. As such, some embodiments may use the pickup location score to identify nearby locations that may be better locations for a pickup than a requested location.

The pickup location score may be determined through a variety of different methods using different types of information captured by the dynamic transportation matching system. For example, the pickup location score may be based on rates of contact between providers and requestors for matched rides at a particular request location (e.g., a percentage of rides associated with the request location that result in one of the parties contacting the other party before a pickup), an average travel distance of a requestor to a provider for a matched ride to be initiated for a particular request location (e.g., a difference between a request location and the actual location that the requestor was picked up), cancellations (either from the provider or the requestor), and/or a delay time measured between a time of arrival by a provider at a request location and a time of arrival of the requestor to the provider for the start of the matched ride (e.g., how long it took for the requestor and driver to find one another). Additionally, cancelation rates of matched rides associated with a request location and any other information associated with delay between a provider and a requestor that can be associated with a poor location for a pickup may be used in determining a pickup location score for a location. Embodiments may track statistics for each request between a requestor and a provider through the dynamic transportation matching system and may use the stored ride history information to build a pickup location score (PLoS) model that can be applied to any request location. The pickup location scores may be time dependent such that a pickup location score for a particular location during one time (e.g., morning commute) is different than during another time (e.g., afternoon). Accordingly, ride history may be stored and used to generate different pickup location scores for a location according to variables including time (e.g., morning, commute, afternoon, night, etc.), day (e.g., weekday, weekend, holidays, etc.), season (e.g., summer, winter, etc.), weather (e.g., overcast, raining, snowing, etc.), road conditions (e.g., dry, slick, icy, etc.), and/or any other variables that may affect traffic flow and/or pickup conditions of a location.

Further, in some embodiments, pickup location score thresholds may be used to indicate whether an alternate location should be determined for a request received through the dynamic transportation matching system. For example, request locations having a pickup location score that indicates the request location will be particularly poor (e.g., under a pickup location score threshold) may be matched with better locations within a particular distance (e.g., a reasonable walking distance for the requestor) of the request location. Additionally and/or alternatively, some embodiments may use the pickup location score as a filter to ensure that any optimization of pickup locations is only performed on those locations that are of a sufficient quality. For example, pickup location scores for alternate request locations may be compared to a threshold pickup location score before being used in any pickup optimization process to ensure the location being optimized is at least a certain quantitative quality and will not result in a loss of time savings from the optimization due to a low quality pickup location.

Moreover, in some embodiments, the location score may be converted into a delay time that can be applied to an estimated travel time and/or estimated time of arrival for a request. For example, the average amount of delay time between a provider arriving at a request location and the matched ride starting may be incorporated into an estimated arrival time to a destination location for the request so that the requestor and provider can more accurately forecast their arrival times and travel times. Further, arrival notifications may incorporate the delay due to the request location and an arrival notification may be sent prior to arrival of the provider at the request location to limit the delay associated with the request location. In some embodiments, the converted delay time from the pickup location score may be incorporated into the pickup path optimization process to ensure that the alternate request location determination process incorporates the delay due to the quality of the pickup location. For example, embodiments may determine an alternate request location for a request by determining that an alternate location may save 20 seconds of travel time based on pickup location score but may lose 10 seconds compared to a previous request location based on the pickup route.

Accordingly, embodiments may determine, track, and use measured quality scores of pickup locations based on previous ride history data to better estimate pickup and travel times and direct providers and requestors to more efficient pickup locations within a predetermined distance from a requested pickup location.

Additionally, one or more embodiments may use curb segment data, such as may be stored by a curb identification system based on road and building data. For example, road data may be received that includes such information as locations, directions, lengths, etc. of a layout of roads in a particular geographical area. Building data may be received that includes information such as locations and shapes of various buildings in the particular geographical area, from which perimeter edges of the buildings, at least some of which are adjacent to the roads, may be determined. In an embodiment, based on the building and road data (e.g., road data describing a layout of roads in a particular geographical area, the layout including a location, center line, direction, and length of one or more roads in the layout of roads), a width of a road may be determined, such as based on a distance from an estimated center line of the road to a perimeter edge of an adjacent building. Based on the road width and the building perimeter, a curb segment may be determined. For example, a curb segment between the at least one road and the one or more adjacent buildings may be determined based at least on the width of the at least one road and the perimeter edges of the one or more adjacent buildings. A curb may then be determined, for example, by finding an intersection between roads represented by a polygon, and locating points of the polygon (e.g., where the roads intersect) and drawing lines between the intersection points to form edges of the polygon. Curb segment data describing a layout of the curb segments in the particular geographical area may be stored; for example, using geospatial points describing latitude and longitude, etc.

Additionally, in some embodiments, the curb segment data may incorporate local features and landmarks (e.g., fire hydrants, no parking zones, loading zones, etc.) and use the local features to create sub-segments that incorporate the local street features. For example, a curb segment that includes a fire hydrant may be separated into sub-segments that capture the area before the fire hydrant, the fire hydrant, and after the fire hydrant. Each of the sub-segments may have a different pickup location score that indicates that the location surrounding the fire hydrant is an objectively better pickup location than the surrounding sub-segments of the curb. Accordingly, the fire hydrant section may be more easily identified based on the pickup location scores associated with the three sub-segments of the curb segment.

Accordingly, embodiments provide for a determination of more efficient request locations from which a transport request to a destination may be determined, which can limit the use of system resources for unnecessary canceled ride requests and the issuance of new ride requests, as well as the lost downtime and increased throughput of providers.

FIG. 1 illustrates an example of a ride matching system 130 including a matched provider 140A and requestor 110A, in accordance with an embodiment of the present techniques. The ride matching system 130 may be configured to communicate with both the requestor computing device 120 and the provider computing device 150. The provider computing device 150 may be configured to communicate with a provider communication device 160 that is configured to easily and efficiently display information to a provider 140 and/or a requestor 110. The requestor 110 may use a ride matching requestor application on a requestor computing device 120 to request a ride at a specified pick-up location. The request may be sent over a communication network 170 to the ride matching system 130. The ride request may include transport request information that may include, for example, a request location, an identifier associated with the requestor and/or the requestor computing device, user information associated with the request, a location of the requestor computing device, a request time (e.g., a scheduled ride may have a future time for the request to be fulfilled or an "instant/current" time for transportation as soon as possible), and/or any other relevant information to matching transport requests with transport providers as described herein. The request location may include, for example, a current location, a future location, a "best fit/ predictive" location, a curb segment, or any other suitable information for indicating a location for a requestor to be found at the current time or in the future. In some embodiments, the transport request may further include other request related information including, for example, requestor transport preferences (e.g., highway vs. side-streets, temperature, music preference (link to 3$^{rd}$ party music provider profile, etc.), personalized pattern/color to display on provider communication device, etc.) and requestor transport restrictions (e.g., pet friendly, child seat, wheelchair accessible, etc.).

The requestor computing device may be used to request services (e.g., a ride or transportation, a delivery, etc.) that may be provided by the provider 140A. The provider computing device may be used to contact available providers and match a request with an available provider. However, a location associated with the request may not be the most efficient location with regard to provider travel time to the request location and/or provider travel time from the request location to a destination location. For example, a provider may have to take a long, circuitous route to the request location, whereas if the requestor were to walk down to a new curb segment on an adjacent block, the provider would have a shorter route to the request location, and/or the provider may have a more efficient route to the destination (e.g., not have to loop around a block, etc.). Thus, embodiments provide a solution that allows a ride matching system to determine whether another curb segment within a threshold distance of the request location would reduce travel times associated with one or more legs of a journey (e.g., the journey to the request location, the journey from the request location, a journey with multiple request locations and/or destination locations, etc.) to ensure the most efficient matching leading to the least amount of provider downtime and the most possible throughput by the ride matching system.

The ride matching system (also referred to as a "dynamic transportation matching system") 130 may identify available providers that are registered with the ride matching system 130 through an application on their provider communication device 150A. The ride matching system 130 may send the ride request to a provider communication device 150A and the provider 140A may accept the ride request through the provider communication device 150A. Additionally and/or alternatively, in some embodiments, the provider may be predictively and/or automatically matched with a request such that the provider may not explicitly accept the request. For instance, the provider may enter a mode where the provider agrees to accept all requests that are sent to the provider without the ability to decline and/or review requests before accepting. In either case, the provider computing device may return information indicative of a match indicating that the provider received the transport request. For example, the information indicative of a match may include a provider accept indicator (e.g., a flag) that indicates the provider received and accepts the indicator or could include a variety of different information. For example, the information indicative of a match may include location information, other route information for other passengers in the vehicle, a schedule for the provider providing information regarding future availability (e.g., when they are going to go offline), diagnostics associated with the car (e.g., gas level, battery level, engine status, etc.), and/or any other suitable information. The provider 140A and the requestor 110A may be matched and both parties may receive match information associated with the other respective party including requestor information (e.g., name, representative symbol or graphic, social media profile, etc.), provider information (e.g., name, representative symbol or graphic, etc.), request location, destination location, respective computing device location, rating, past ride history, any of the other transport request information and/or provider acceptance information identified above, and/or any other relevant information for facilitating the match and/or service being provided. Thus, the ride matching system 130 may dynamically match requestors and providers that are distributed throughout a geographic area.

Figure 2A:
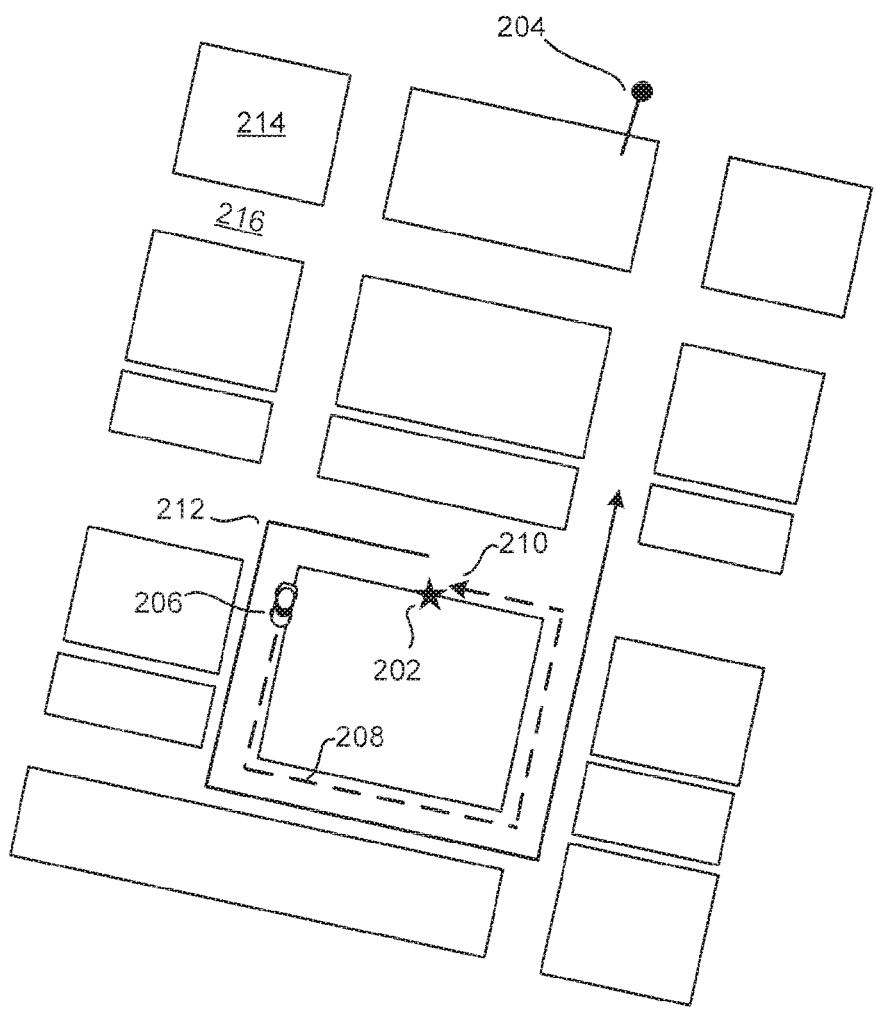
FIGS. 2A-2C illustrate an example of a ride matching system environment where pickup paths to pickup locations are determined, in accordance with an embodiment of the present techniques.
Figure 2B:
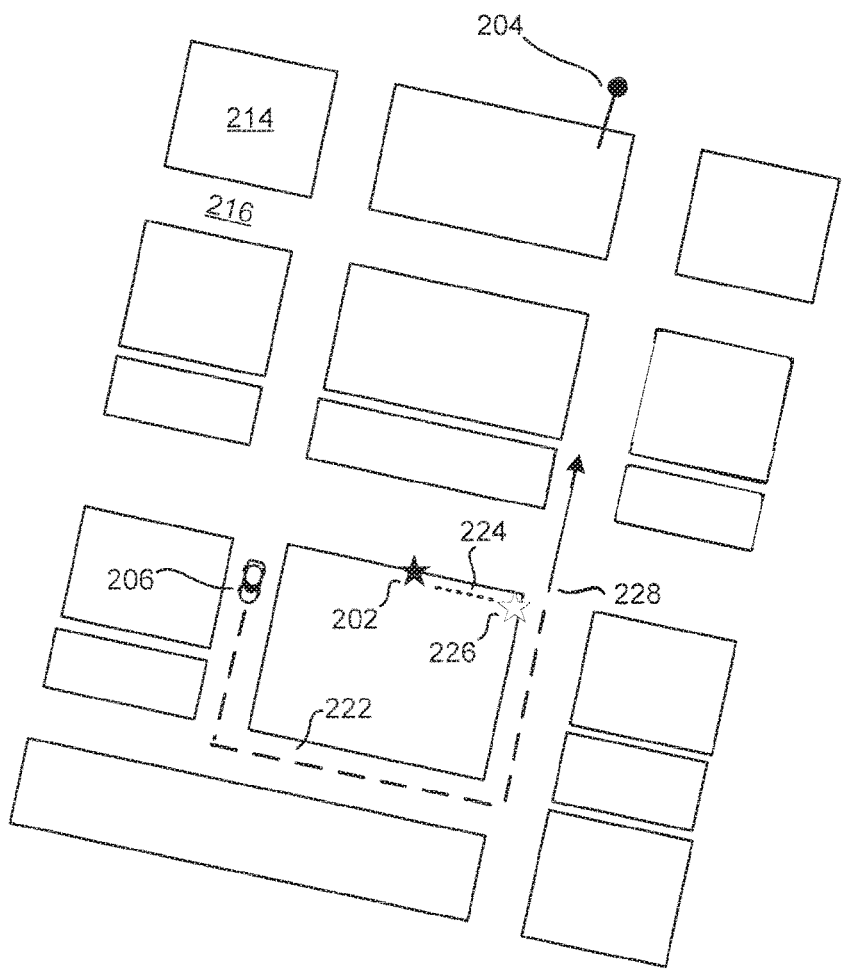

FIGS. 2A-2B illustrate an example of a ride matching system environment where pickup paths to pickup locations are determined, in accordance with an embodiment of the present techniques. In the example 200 of FIG. 2A, there are a number of buildings 214 with roads 216 running between them. A person has requested a ride (e.g., transport) at a location 202 outside one of the buildings, with a destination 204 indicated in the request. A provider 206 has been matched to the request, and is presented with a navigation route 208 (e.g., provided by a ride matching system, self-determined by sending a location to an online navigation system, etc.) to the requestor's location 202. In this example, the provider has to travel around the block to pick up the requestor (e.g., the provider cannot make a U-Turn). Once the provider 206 picks up the requestor at the location 210, the provider 206 has to continue around the block on his route 212 to the destination 204; for example, the street on which the request location 202 is located may be a one-way street, or traffic makes a U-Turn unsafe, etc.

In the example of FIG. 2B, an alternate request location 226 has been provided to the requestor once the request has been matched to the provider 206, along with a route 224 along which the requestor may walk to get to the alternate request location 226. As illustrated in FIG. 2B, by traveling to the alternate request location 226, the navigation route 222 taken by the provider to the alternate request location is shorter (i.e., no extra turn around the block to the original request location 202 is required) because the requestor has moved to a different curb segment. Similarly, after the provider 206 picks the requestor up at the alternate request location 226, the navigation route 228 to the destination is shorter (i.e., the provider 206 does not have to circle the block).

Figure 2C:
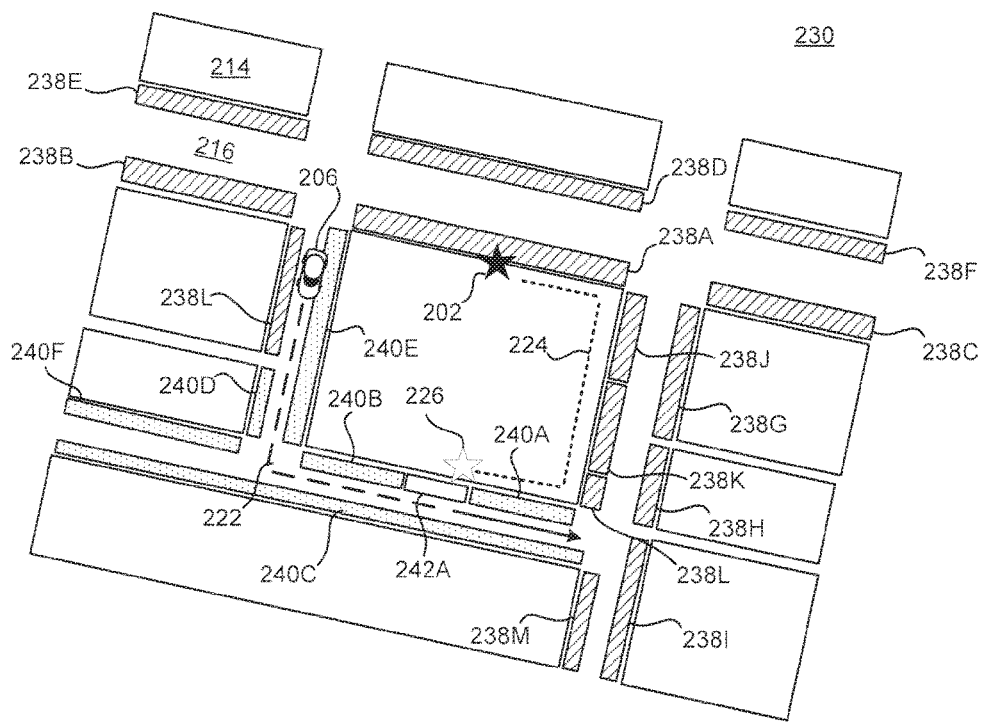

FIG. 2C illustrates an example of a ride matching system environment 230 where pickup location scores 238-242 associated with different pickup locations are determined and used in determining an alternate pickup location 226 for a request, in accordance with an embodiment of the present techniques. Similar to FIGS. 2A-2B, in the example 230 of FIG. 2C, there are a number of buildings 214 with roads 216 running between them and the person has requested a ride (e.g., transport) at a location 202 outside one of the buildings, with a similar destination (not shown) indicated in the request. In this example, pickup location scores associated with a variety of curb segments are shown in different patterned strips 238-242. For example, curb segments associated with locations having poor pickup locations scores 238A-238K are shown in a first pattern (e.g., a striped pattern). The locations or curb segments with poor pickup locations may not meet a pickup location score threshold value and thus may be incompatible or undesirable locations for using as an alternate request location. The pickup location score threshold value may be determined based on historical data of previous pickup locations, time to pickup, time from pickup to start of ride, or other factors such as ease of navigation to the location, legality and safety of the location for the provider to pick up the requestor, historical reduced cancelations, historical numbers of successful pickups, etc. Thus a location having a score that meets the pickup location score threshold may indicate that the location is suitable for a pickup and likely to be successful. Poor pickup location scores may indicate that a large delay and/or a high percentage of matched requests associated with the location result in contacts between providers and requestors or cancelations.

Curb segments associated with locations having moderate pickup location scores 240A-240F are shown in a second pattern (e.g., a dotted pattern). The locations or curb segments with moderate pickup location scores may meet a pickup location score threshold but may not be excellent locations for interactions between providers and requestors. The moderate pickup location scores may indicate that some delay and/or contacts between providers and requestors is probably for the matched request but that the delay is minimal or reasonable.

Curb segments associated with locations having good pickup location scores 242A are shown in a third pattern (e.g., solid pattern). The locations or curb segments with good pickup location scores 242A may not only meet the pickup location score threshold but may also have a minimal or a negligible probability of delay, contacts between parties, or cancelations due to the location of the interaction. As described herein, pickup location scores may be determined using historical ride information associated with thousands of previous rides and may be associated with times, dates, days of a week, and/or any other associated variable to ensure the data is relevant to the present request. For example, the locations and/or curb segments having poor pickup locations may have a history of matched rides at that time, day of the week, etc. that resulted in contacts between providers and requestors, longer distances between a request location and the ultimate pickup location of the matched ride, and/or long delays between providers arriving at a location and the requestor meeting the provider. These are just a few examples of some of the indications of a poor pickup experience associated with a pickup location and additional criteria can be used to identify poor pickup locations including cancelations, poor requestor ratings, poor provider ratings, etc.

The differences in pickup location scores between the various areas may be due to the road conditions, configurations, and/or features of the roads 214 and buildings 216. For example, the curb segments 238A and 238J may be on busy one way roads with parking on those streets that makes it difficult to find a suitable space to stop and enable an interaction between a provider and a requestor. Further, those areas may be closed off due to construction, may be inaccessible by pedestrians, and/or may be inaccessible by providers. Any number of different reasons may exist for the poor location scores associated with those locations 238A-238K and these are only a couple examples of the types of obstacles that may result in poor location scores. However, by using pickup location scores based on historical ride data, the dynamic transportation matching system may identify that these locations are not good locations for selecting as a modified request location for a request. For example, historical ride data can include previous cancellations at that location, made either by the provider or the requestor, which can affect the location score, indicating that the location may be prone to cancellation because of inaccessibility, difficulty in finding the location, etc. Further, if a request is received that is associated with one of these locations, the dynamic transportation matching system may identify that an alternate request location may be beneficial for the request.

As can be seen in FIG. 2C, the locations associated with the curb segments 240A-204F and 242A are better locations for the request. As such, the system may determine alternate request locations surrounding the request location and may determine pickup location scores associated with those curb segments and/or the specific alternate request locations. The pickup location scores associated with the surrounding curb segments may be identified and ranked to determine the best possible alternate request locations for the request. In some embodiments, the highest possible pickup location may be determined for the request and used as an alternate request location for a request. Additionally and/or alternatively, in some embodiments, the pickup location scores may be compared to a threshold pickup location score value and as long as they meet that threshold value, the locations may be sufficiently fit as an alternate pickup location for the request. As such, a pickup location score threshold may be used to filter potential alternate request locations that may be used in optimizing a pickup location for travel time or arrival time to a destination but the pickup location score values may not be compared to one another to identify the best possible location. Instead, the location and navigation route of the provider may impact the alternate pickup location that is selected as a modified request location for the request. Further, in some embodiments, the pickup location scores may be converted into time delay metrics that may be factored into a pickup location optimization process that may weigh the potential gain from a pickup location with less delay that is further off course from a provider and/or requires further travel by a requestor than another location. Either way, the characterization of the curb segments using pickup location scores can be used to identify alternate request locations and a modified request location for a request in a geographical region.

As shown in FIG. 2C, some curb segments may be further segmented to incorporate local features and/or landmarks in a map. For example, the curb segments 240A-240B and 242A are sub-segments of a traditional curb segment. However, the sub-segments 240A-240B are divided by a third sub-segment 242A. The third sub-segment 242A has a better pickup location score than the sub-segments 240A-240B. The sub-segment 242A indicates that the curb has a particular quality that makes it a particularly good location for requests to be matched. This is most likely due to a loading zone, temporary parking area, and/or other local feature of the curb that allow the location to be particularly good for matching rides. As will be described in further detail below, the sub-segment 242A may be identified and segmented from the larger sub-segment based on infrastructure and/or local feature data that indicates the location may be a positive location for pickups. For example, as will be described in further detail below, a curb estimation module may receive infrastructure information associated with the curb segment that indicates that the location may have a loading zone, fire hydrant, and/or other infrastructure that means the curb segment should be its own sub-segment. However, the identification of the local features and/or the corresponding sub-segment has no effect on whether the sub-segment may have a good pickup location score.

For example, sub-segments 283J-238L include multiple sub-segments within a uniform curb segment indicating that a local feature or landmark is present at the location. However, the curb sub-segments having poor pickup location scores meaning that although a local feature is present, the road features and/or road configuration does not result in beneficial pickup results. Accordingly, although in some embodiments, curb sub-segments may indicate potentially better pickup location scores, the historical ride data is used to determine the ultimate pickup location scores for the locations within the curb sub-section. Thus, the use of the particular historical ride information and the criteria that are used to identify pickup location scores provide counter-intuitive benefits that systems that merely use local features to identify good request locations would not identify because many of those locations have particular unique road features and configurations that still result in poor interactions at those locations (e.g., gridlock, road construction, inaccessible areas to pedestrians, etc.). Accordingly, the quantitative analysis of historical ride information and the dynamic pickup location scoring models provide advantages over map-based analysis systems.

As shown in FIG. 2C, the dynamic transportation matching system may identify a set of alternate request locations associated with one or more of the curb segments 238A-238M, 240A-240F, and 242A and may identify that a location associated with the curb sub-segment 242A is the best alternate request location for the request. As such, the dynamic transportation matching system may modify the request location 202 to the modified request location 226 and navigate the requestor to the modified request location 226. In this example, the request may travel around the block further than the example shown in FIG. 2B to meet the provider. Once the provider 206 picks up the requestor at the location 226, the provider 206 may continue with the route 222 to the destination (not shown).

Figure 3:
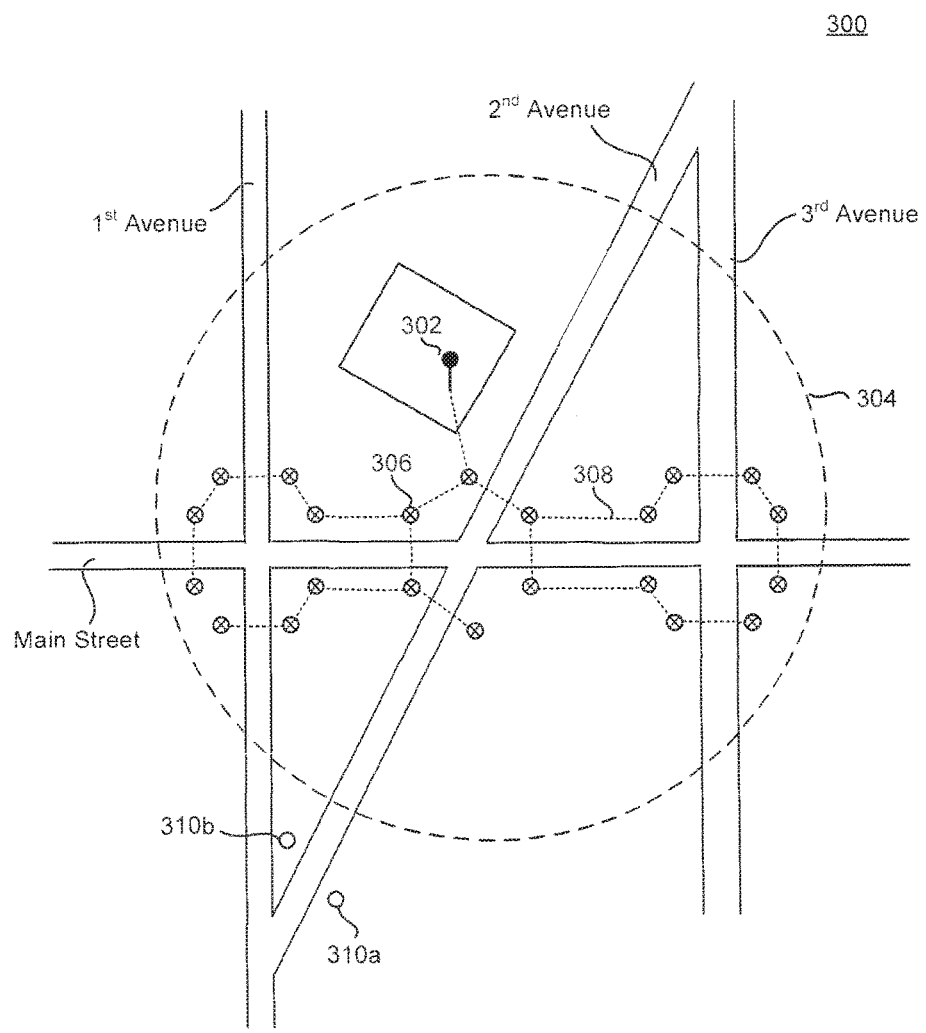
FIG. 3 illustrates an example of a ride matching system environment where multiple alternate pickup locations corresponding to curb segments are determined, in accordance with an embodiment of the present techniques.

FIG. 3 illustrates an example 300 of a ride matching system environment where multiple alternate pickup locations corresponding to curb segments are determined, in accordance with an embodiment of the present techniques. In the example 300 of FIG. 3, a request location 302 is displayed in a building between $1^{st}$ and $2^{nd}$ Avenues, which indicates that a requestor made a transport request from that location, although in some embodiments, the requestor may have manually placed the request location in the building. A threshold distance 304 from the request location is determined; for example, it may be a uniform radius surrounding the request location, while in other embodiments the threshold distance may be a custom area, dynamically and/or automatically generated based on various factors, generated as the result of a user selection, etc.

According to an embodiment, a number of alternate request locations 306, such as corresponding to curb segments within a particular area (e.g., within a threshold distance 304 of the request location 302) may be determined. According to an embodiment, a threshold distance 304 from the request location 302 may be determined along with a number of alternate request locations 306 within the threshold distance 304. For example, the dynamic transportation matching system may maintain data indicating a default distance from a request location 302 that will be used for every request. This data may apply to all or a subset of requestors; for example, a user may set a default distance in an application, which is then sent to the dynamic transportation matching system and stored in relation to the requestor's account and used for future requests. In an embodiment, the distance may be automatically determined based on a requirement that a minimum and/or maximum number of alternate request locations 306 be provided in response to the request. For example, a particular request may be associated with data at the dynamic transportation matching system that indicates that at least 10 but no more than 20 alternate request locations 306 be found for the request. Geographic data may be provided to the dynamic transportation matching system, for example via an application programming interface (API) or by the dynamic transportation matching system performing an API call to a separate geolocation database, etc., and a determination made that the request is associated with a dense urban area. Therefore, a small initial threshold distance 304 may be used. If the request were from a less dense area, then a larger initial threshold distance 304 may be utilized. Based on the initial threshold distance 304, a number of alternate request locations 306 is determined. If the number is less than the minimum, then the threshold distance 304 may be increased and another determination made, and so forth, until a minimum number of alternate request locations 306 is found, and vice versa for a maximum number. By dynamically increasing the threshold distance 304 in stages, stress on the dynamic transportation matching system may be alleviated by allowing the dynamic transportation matching system to perform an analysis on the smallest threshold distance 304 possible to find an adequate number of alternate request locations 306.

In an embodiment, a subset of the potential alternate request locations 306 within the threshold distance 304 may be selected; for example, based on data associated with the requestor. In this example, a device associated with the requestor may have data describing certain characteristics that may be utilized in determining an appropriate threshold distance 304. The dynamic transportation matching system may receive this data from the device via an API call from an application to the operating system on the device, or may be pushed to the dynamic transportation matching system in response to a user of the device selecting various criteria that are allowed to be used. For example, the requestor's age may indicate that a smaller threshold distance 304 is appropriate (e.g., the requestor may be elderly), and vice versa. A user may have a setting in the application indicating a maximum walking distance they are willing to accept in order to travel to an alternate request location 306. Data on the device, such as accumulated and stored by a motion detection component, may allow the dynamic transportation matching system to determine that the user walks an above-average amount (e.g., compared to other users), and therefore may be more inclined to walk a longer threshold distance 304. Elevation data, such as may be received by the dynamic transportation matching system initiating an API call to an elevation database or similar system, may be used to set the threshold distance 304; for example, if one direction from the request location 302 is uphill (e.g., up a steep hill), then the threshold distance 304 in that direction may be reduced, or the locus of the threshold distance 304 may be shifted away from that direction, and vice versa with a direction that is downhill and easier to walk. Weather data received by the dynamic transportation matching system in response to an API call to a weather service, for example, may be used; for example, in inclement weather, the threshold distance 304 may be reduced. If it is late at night, the threshold distance 304 may similarly be reduced.

According to an embodiment, instead of modifying the threshold distance 304, a subset of the alternate request location 306 within the threshold distance 304 may be selected, such as based on data as described above. For example, a requestor may indicate that she does not want to cross any roads in order to reach an alternate request location 306; therefore, a subset of alternate request locations 306 within the threshold distance 304 (e.g., that do not require a road crossing) is selected. In an embodiment, a number of alternate request locations may be sampled within a range of the requested location and a best or most optimal alternate request location may be determined. For example, there may be a 5 minute ETA for the requestor's current requested location but 2 min ETA for the requestor to walk to an alternate request location around the block. Although these estimated times may include some uncertainty, unpredictability, and/or error, the estimated times may also factor in probabilities and tradeoffs between the location (e.g., convenient, easy location for pickup) and overall trip time and/or delay. The pickup request location and sample pickup locations around that pickup request location may be evaluated for their respective pickup location scores and any time savings/experience may be factored in combination with the pickup location scores. For the estimated time savings/experience, statistical probabilities may be applied (e.g., at least 80% likelihood or confidence that there will be time savings, etc.).

In the example of FIG. 3, a subset of alternate request locations 306 has been selected. In an embodiment, this may be based on evaluating curb segment data. For example, curb segments between each intersection point with the threshold distance 304. For example, an intersection point between $1^{st}$ Avenue and Main Street, an intersection point between $2^{nd}$ Avenue and Main Street, and $3^{rd}$ Avenue and Main Street. In the example of FIG. 3, the intersection point between $1^{st}$ Avenue and $2^{nd}$ Avenue is outside the threshold distance 304; therefore, potential alternate request locations 310a, 310b are not part of the subset.

According to an embodiment, at each intersection point, an alternate request location may be associated with each intersecting curb segment. According to an embodiment, a travel path 308 from the request location 302 to each of the alternate request locations 306 may be determined; for example, an optimal path to each alternate request location 306 from the request location 302. In various embodiments, the optimal path may take criteria into account such as minimal road crossings, elevation data, and the like.

Figure 4A:
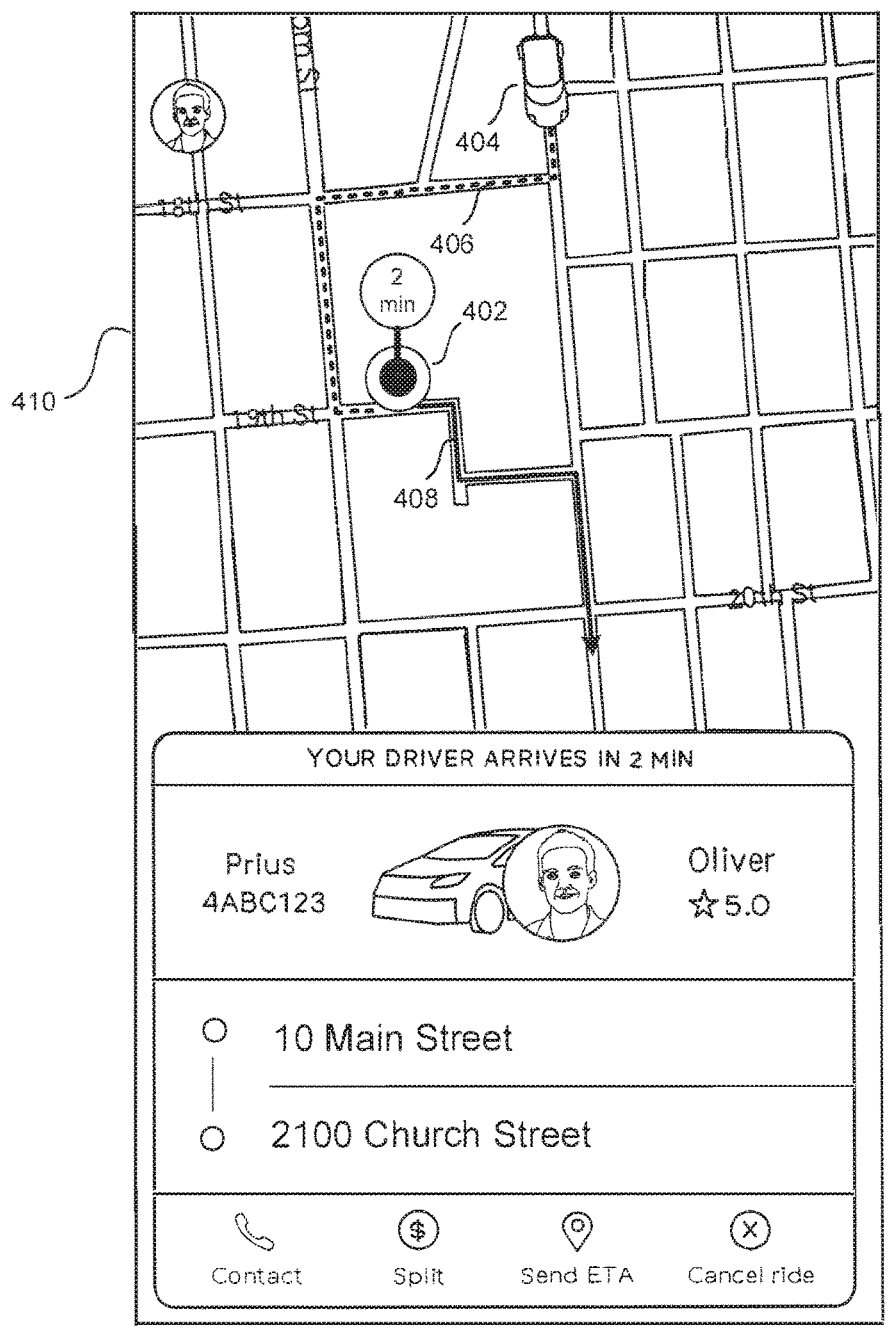
FIGS. 4A-4B illustrate example interface approaches to display data related to optimizing pickup locations, in accordance with an embodiment of the present techniques.
Figure 4B:
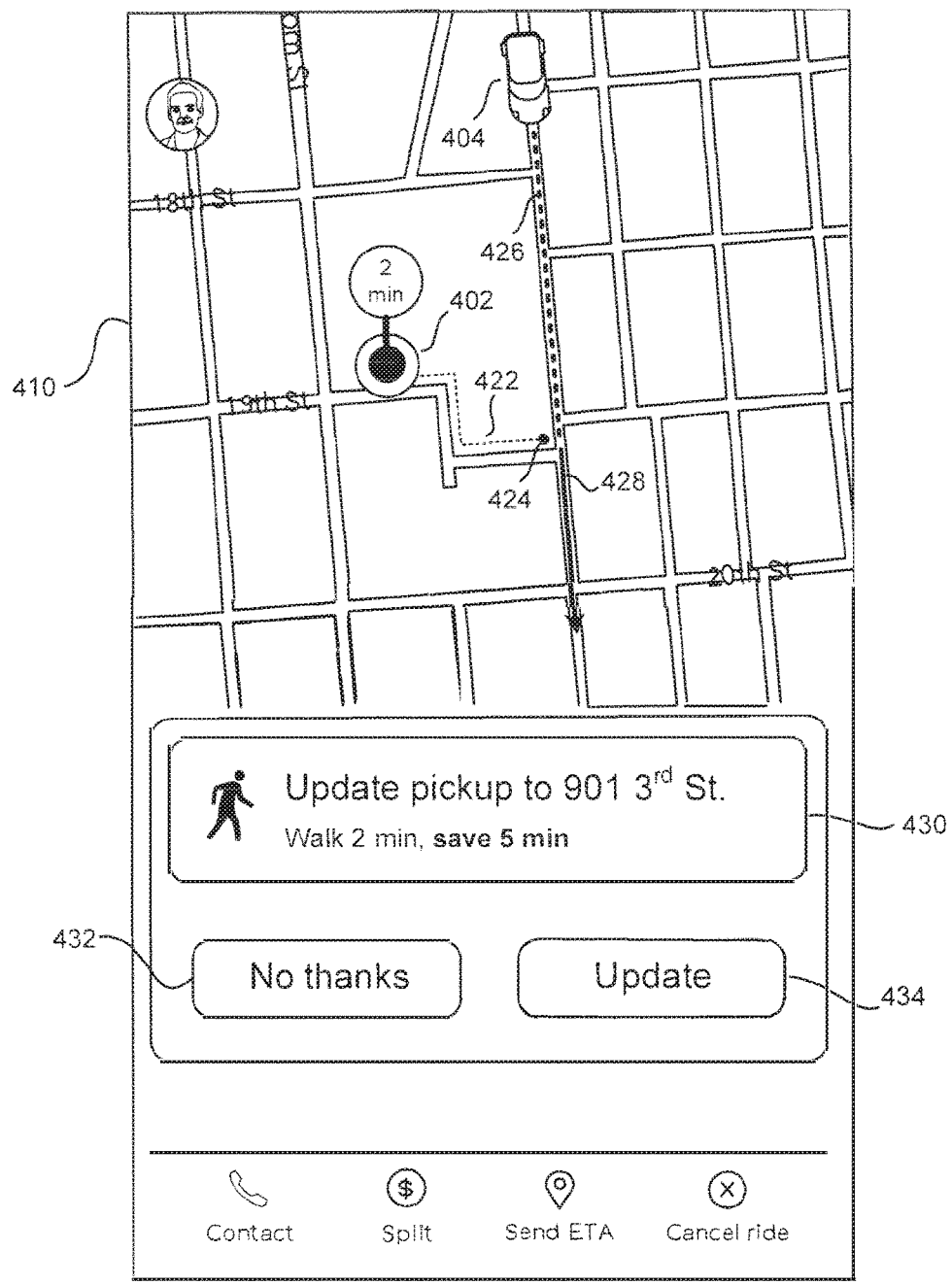

FIGS. 4A-4B illustrate example interface approaches to display data related to optimizing pickup locations, in accordance with an embodiment of the present techniques. In the example 400 of FIG. 4, an application interface 410 is illustrated, as may be displayed on a computing device associated with a provider and/or requestor. In the example interface 410, a request location 402 is displayed at a particular location within the layout of roads. A representation of a provider 404 (e.g., that has accepted a transport request associated with the request location) is displayed at a location corresponding to the provider's current location, and a route 406 of the provider 404 to the request location is illustrated, along with a route 408 to the request destination (not pictured) that will be taken after the requestor is picked up at the request location 402. As can be seen in FIG. 4A, the provider cannot take a direct route to the destination; instead, the current request location 402 requires the provider 404 to make several turns.

In the example 420 of FIG. 4B, an alternate request location 424 has been identified with regard to the request location 402. For example, as described earlier, a threshold distance around the request location 402 may be determined, and a set of alternate request locations evaluated until one (or more, in some embodiments) is found to reduce one of an ETA or ETD, or both, by a particular amount over the original route (as illustrated in FIG. 4A). In this example, the alternate request location 424 is displayed along with a travel path 422 to the alternate request location 424. With this particular alternate request location 424, it can be seen that the provider's route 426 to the alternate request location 424 is more efficient (i.e., shorter, with no turns), and allows for the journey to the destination to proceed immediately down the street 428 after the pickup, without a need for any turns around the block, etc.

Once the alternate request location 424 is selected, in the example of FIG. 4B, the interface 410 presents the requestor on their device with a dialog box or similar element 428 indicating that a new pickup location (i.e., request location) is available and indicating that traveling 2 minutes to the alternate request location 424 will save 5 minutes in the overall journey, although in various embodiments, the ETA to the requestor may be illustrated, the ETD to the destination, or both. The requestor is then able to confirm 432 or decline 430 the alternate request location 424, which decision will then be sent by the dynamic transportation matching system to the provider (e.g., through modified first transport request information) along with the alternate request location 424.

FIGS. 5A-5D illustrate example approaches for curb segmentation techniques, in accordance with an embodiment of the present techniques. In the example 500 of FIG. 5A, a layout of roads 502 is illustrated; for example, $42^{nd}$ Street, Broadway, and $3^{rd}$ Avenue. The layout of roads may be included in road data that also describes properties of one or more of the roads such as length, center lines, direction, location, etc. This road data may comprise a listing of roads along with geospatial data allowing for a layout of roads in accordance with their properties to be constructed. In an embodiment, the road data may comprise OpenStreetMap (OSM) data or similar data. In the example 500 of FIG. 5A, various buildings 504-508 are illustrated, with the lines corresponding to perimeter edges of the buildings 504-508. The buildings and the perimeter data may be included in building data, which in various embodiments describes locations of buildings and a shape or other property from which the building perimeters may be determined. For example, a building may be defined as set of geospatial points that are associated with latitude and longitude values, with the perimeter in one embodiment being defined by edges between the various geospatial points. For example, a square building perimeter may comprise four geospatial points, each being a corner of the building, and edges between sets of the geospatial points comprising a polygon.

Figure 5A:
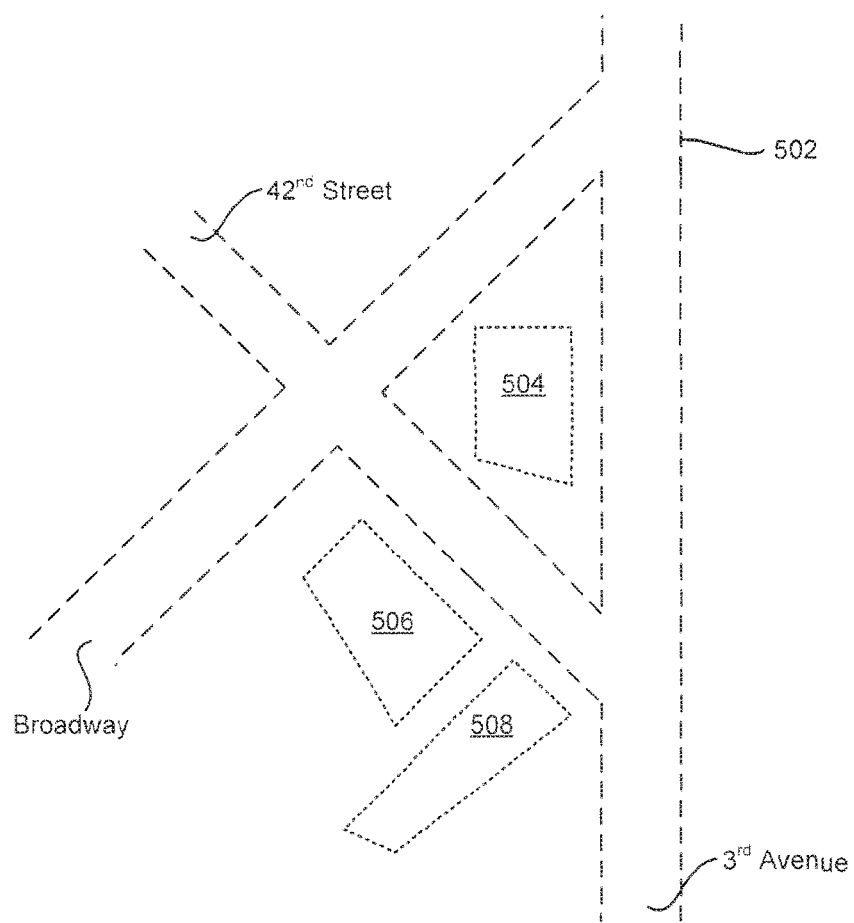
FIGS. 5A-5D illustrate example approaches for curb segmentation techniques, in accordance with an embodiment of the present techniques.
Figure 5B:
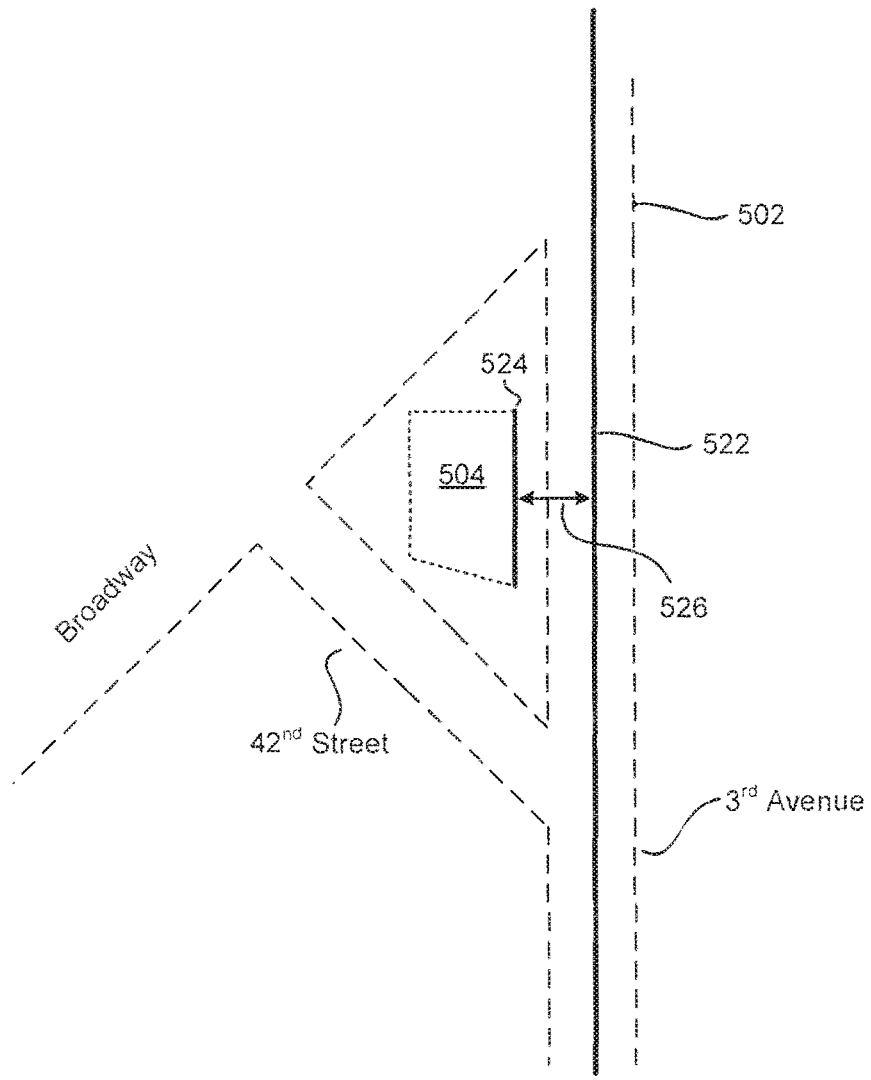

In the example 520 of FIG. 5B, a building 504 perimeter edge 524 adjacent to a road ($3^{rd}$ Avenue) is determined. A width of a road ($3^{rd}$ Avenue) may be determined in one embodiment by determining a center line 522 of the road; for example, based on road data, image analysis, etc. A width of the road may then be determined by comparing the center of the road 522 with a building 504 perimeter 524 adjacent to the road, and in an embodiment, multiplying a distance 526 between a building perimeter edge adjacent the road 524 and a center line of the road 522. In an embodiment, a distance between building perimeter edges adjacent a respective road may be divided in half to give a rough approximation of a road width. In an embodiment, sidewalks or other offsets between a building and a road may be estimated by using an estimation factor. For example, a percentage (e.g., 15%) of the distance from a building perimeter edge to the edge of the adjacent road. According to an embodiment, various elements such as roads, buildings, etc. may be represented as polygons in graphical data and an algorithm or transform such as Grassfire used to shrink the respective polygons.

Figure 5C:
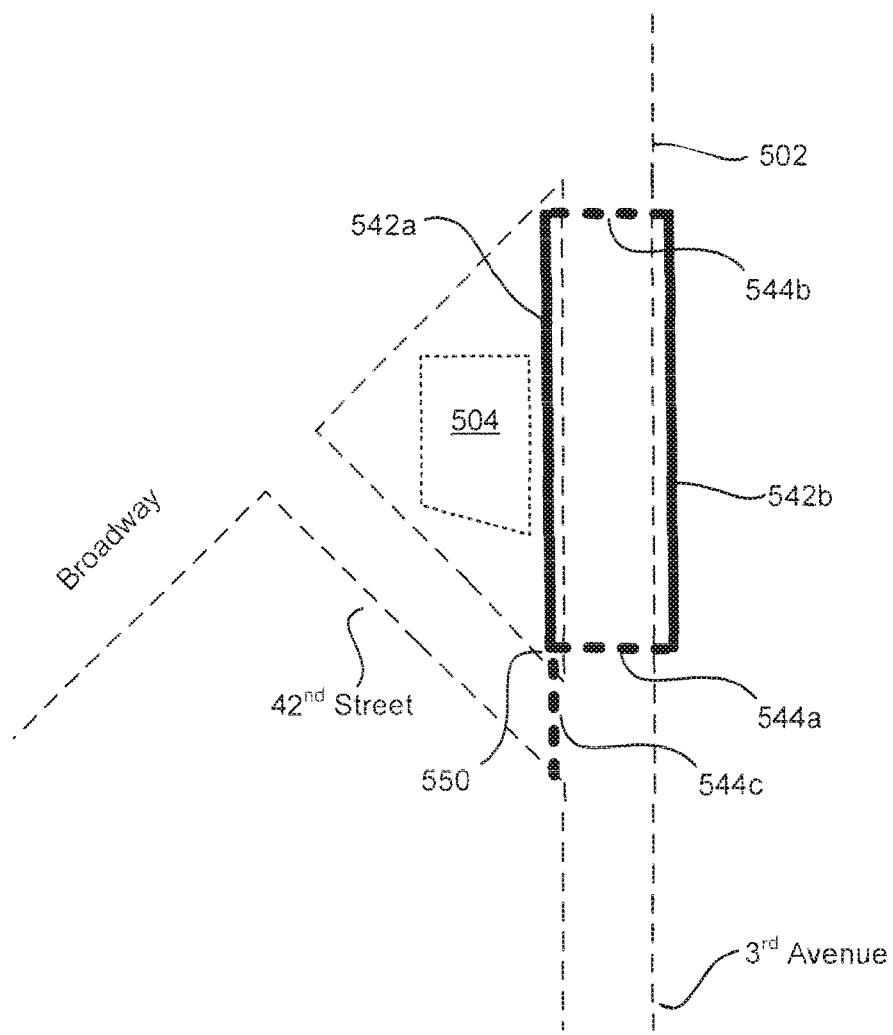

In the example 540 of FIG. 5C, a notion of a curb segment 542a, 542b may be determined based on the width of the road, a center line of the road, and building perimeter edges adjacent the road. For example, the width of the road may be known or may in an embodiment determined, such as by multiplying a distance between a building perimeter and a center line of the road, or in another embodiment dividing in half a distance between building perimeters on opposite sides of a road, as discussed above. According to an embodiment, a curb segment may be thought of as a minimum segment of road where a driver does not have a choice with regard to travel, excepting a U-Turn. For example, road segment 542a in FIG. 5C would comprise a minimum segment of $3^{rd}$ Avenue between $42^{nd}$ Street and Broadway. In an embodiment, crosswalks 544a-544c may be determined by evaluating intersection points between curb segments and estimating a crosswalk at the approximate location of the curb segment intersection. For example, in the example 540 of FIG. 5C, the illustrated curb segment along $3^{rd}$ Avenue 542a intersects 550 with a curb segment (not pictured) of $42^{nd}$ Street between Broadway and $3^{rd}$ Avenue. and two crosswalks 544a, 544c are estimated to allow crossing of the respective roads at those points. In an embodiment, various data may be determined, or derived or gathered from available data sources. For example, the OSM may indicate road width, direction, one way streets, road widths, etc.

Figure 5D:
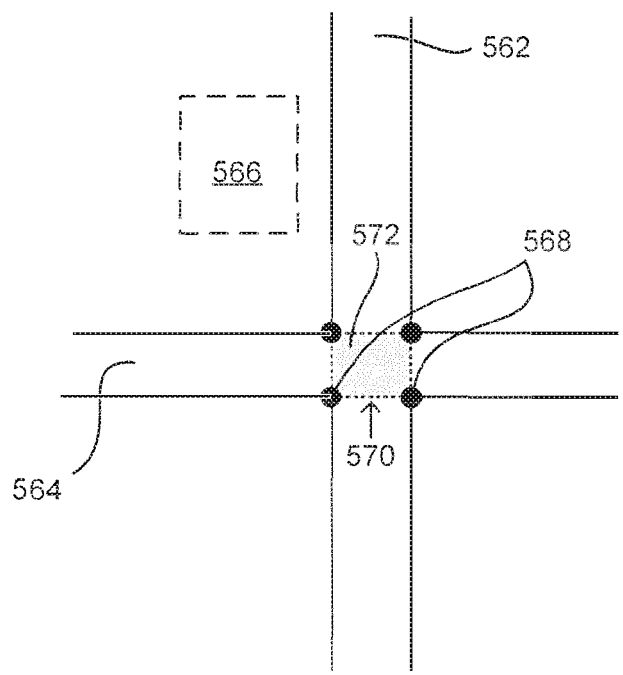

In the example 560 of FIG. 5D, another embodiment for sidewalk estimation is provided. For example, a road 562, 564 in a road network may be considered as a line having a width (road width), which may be defined by at least two points (e.g., two geospatial points indicating latitude and longitude, which when a straight line is drawn between the points represents a road). A road with a curve may comprise more points (e.g., median points where the road is curved. Bezier points, etc.). As discussed herein, by utilizing a perimeter of at least one building 566 and a center line of an adjacent road 562, a road width may be determined and a line segment representing the road determined, with a width of the line segment representing the width of the road. In a sense, the roads may be thought of as flat ribbons. An intersection may be where the "ribbons" intersect 572, with intersection points 568 of the "ribbons" identifying edges of the curbs on each individual side of the roads 562, 564. The intersection area 572 may represent a polygon, with lines 570 between the intersection points 568 describing edges of the polygon, which may be thought of as crosswalks. In an embodiment, a database of curb segments may comprise data representing "lines segments," such as geospatial points having latitude and longitude. In an embodiment, a curb segment may be represented in a database as a polygon, with points and/or edges of the polygon being described by geospatial points.

Figure 6:
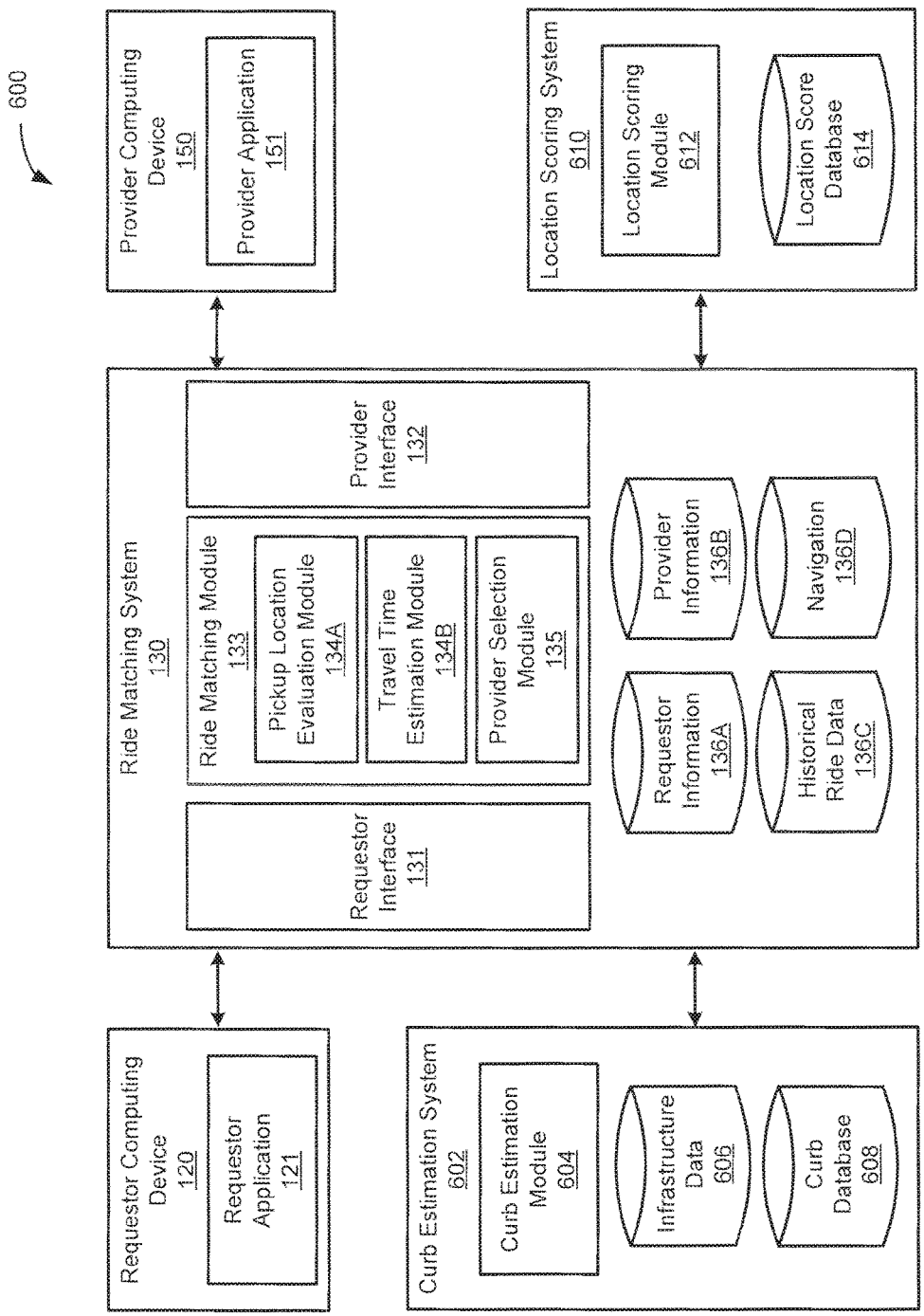
FIG. 6 illustrates an example block diagram of a ride matching system, in accordance with an embodiment of the present techniques.

FIG. 6 illustrates an example block diagram 600 of a ride matching system 130, in accordance with an embodiment of the present techniques. As described above, the ride matching system 130 may identify and facilitate request matching from requestors 110 associated with requestor computing devices 120 with available providers 140 associated with provider computing devices 150. The ride matching system 130 may include a requestor interface 131, a provider interface 132, and a ride matching module 133 including a travel tie estimation module 134B, and a provider selection module 135. The ride matching system 130 may also include a requestor information data store 136A, a provider information data store 136B, a historical ride data store 136C, and a navigation data store 136D which may be used by any of the modules of the ride matching system 130 to obtain information in order to perform the functionality of the corresponding module. The ride matching system 130 may be configured to communicate with a plurality of requestor computing devices 120 and a plurality of provider computing devices 150. Although the ride matching system 130 is shown in a single system, the ride matching system 130 may be hosted on multiple server computers and/or distributed across multiple systems. Additionally, the modules may be performed by any number of different computers and/or systems. Thus, the modules may be separated into multiple services and/or over multiple different systems to perform the functionality described herein.

Although embodiments may be described in reference to ride requests, any number of different services may be provided through similar request and matching functionality. Accordingly, embodiments are not limited to the matching of ride requests and one of ordinary skill would recognize that embodiments could be implemented for any number of different services that have requestors and providers being matched through a network of connected computing devices.

The requestor interface 131 may include any software and/or hardware components configured to send and receive communications and/or other information between the ride matching system 130 and a plurality of requestor computing devices 120. The requestor interface 131 may be configured to facilitate communication between the ride matching system 130 and the requestor application 121 operating on each of a plurality of requestor computing devices 120. The requestor interface 131 may be configured to periodically receive ride requests, location information, a request location (also referred to as a "pick-up" location), requestor status information, a location of the requestor computing device, progress toward a request location by the requestor computing device, and/or any other relevant information from the requestor computing device 120 when the requestor application 121 is active on the requestor computing device 120. The ride request may include a requestor identifier, location information for the requestor computing device 120, a pick-up location for the ride request, one or more destination locations, a pick-up time, and/or any other suitable information associated with providing a service to a requestor. The ride request may be sent in a single message or may include a series of messages. The ride matching module 133 may receive the ride request and update a historical ride data store 136C with the ride request information.

Additionally, the requestor interface 131 may be configured to send ride match messages, location information for the provider computing device, provider information, travel routes, pick-up estimates, traffic information, requestor updates/notifications, and/or any other relevant information to the requestor application 121 of the requestor computing device 120. The requestor interface 131 may update a requestor information data store 136A with requestor information received and/or sent to the requestor, a status of the requestor, a requestor computing device location, and/or any other relevant information.

A requestor computing device 120 may include any device that is configured to communicate with a ride matching system 130 and/or provider computing device 150 over one or more communication networks 170. The requestor computing device 120 may comprise a processor, a computer-readable memory, and communication hardware and/or software to allow the requestor computing device 120 to communicate over one or more communication networks 170. For example, a requestor computing device 120 may include a mobile phone, a tablet, a smart watch, a laptop computer, a desktop computer, and/or any other suitable device having a processor, memory, and communication hardware. In some embodiments, the requestor computing device 120 may include a requestor application 121 that is configured to manage communications with the ride matching system 130 and interface with the user (i.e., requestor) of the requestor computing device 120. The requestor application 121 may allow a user to request a ride, monitor the status of a matched ride, pay for a ride, monitor past rides, perform any other requestor-oriented services related to the ride matching system 130, and/or obtain any other requestor-oriented information from the ride matching system 130.

The provider interface 132 may include any software and/or hardware configured to send and receive communications and/or other information between the ride matching system 130 and a plurality of provider computing devices 150. The provider interface 132 may be configured to periodically receive location information of the provider computing device 150, provider status information, and/or any other relevant information from the provider computing device 150 when the provider application 151 is active on the provider computing device 150. Additionally, the provider interface 132 may be configured to send ride requests, location information of a requestor computing device 120, pick-up locations, travel routes, pick-up estimates, traffic information, provider updates/notifications, and/or any other relevant information to the provider application 151 of the provider computing device 150. The provider interface 132 may update a provider information data store 136B with provider information received and/or sent to the provider, a status of the provider, a provider computing device location, and/or any other relevant information.

A provider computing device 150 may include any computing device that is configured to communicate with a ride matching system 130 and/or provider computing device 150 over one or more communication networks 170. The provider computing device 150 may comprise a processor, a computer-readable memory, and communication hardware and/or software to allow the provider computing device 150 to communicate over one or more communication networks 170. For example, a provider computing device 150 may include a mobile phone, a tablet, a smart watch, a laptop computer, a desktop computer, and/or any other suitable device having a processor, memory, and communication hardware. In some embodiments, the provider computing device 150 may include a provider application 151 that is configured to manage communications with the ride matching system 130 and interface with the user of the provider computing device 150. The provider application 151 may allow a user to accept a ride request, monitor the status of a matched ride, obtain or generate navigation directions or a mapped route for a matched ride, get paid for a ride, monitor past rides, perform any other provider-oriented services related to the ride matching system 130, and/or obtain any other provider-oriented information from the ride matching system 130.

The ride matching module 133 may include a software module that is configured to process ride requests, ride responses, and other communications between requestors and providers of the ride matching system 130 to match a requestor and a provider for a requested service. For example, the ride matching module 133 may be configured to identify available providers for a ride request from a requestor by identifying a geographic region associated with the pick-up location and may search a provider information data store 136B to identify available providers within a predetermined distance of the pick-up location and/or the geographic region.

The ride matching module 133 may include a pickup location evaluation module 134A, a travel time estimation module 134B, and a provider selection module 135 that are configured to allow the ride matching module to perform efficient matching using the dynamic model described herein. For example, when the ride matching module 133 receives the request, the ride matching module may pass the transport request information including the request location, the request time, the requestor identifier, the location of the requestor, and/or any other relevant information to the pickup location evaluation module 134A, the travel time estimation module 134B, or both.

The pickup location evaluation module 134A may be configured to evaluate a request location to determine if the request location is associated with a poor location and/or if an alternate request location may result in a better interaction between a provider and a requestor. The pickup location evaluation module 134A may receive the request location and may evaluate whether a modified request location may be provided for the request based on the request location. For example, the pickup location evaluation module 134A may be configured to implement a filter for pickup location scores to optimize estimated time to travel and estimated time to destination considering locations only that have a pickup location score that meets a threshold. The pickup evaluation module 134A may filter out those locations that have a poor pickup location score and then optimize the routes based on pickup locations that have pickup location scores that are over the threshold. Alternatively and/or additionally, deltas between different pickup location scores of different locations can be evaluated to determine which location is optimal, particularly when no significant savings in estimated time to travel and/or estimated time to destination can be found. In some embodiments, the pickup location score may be calculated based on previous ride history data to evaluate the location for its fitness as a pickup location. The previous ride history data can also include a number of cancellations associated with that pickup location, either initiated by the provider or the requestor, which can affect the location score of the pickup location to indicate whether it is prone to cancellations. The fitness of the location can be an objective measurement that indicates the pickup location may likely result in reduced wait time for the requestor, while increasing efficiency and productivity for the provider, and increasing overall resource allocation of the dynamic transportation matching system.

For example, in some embodiments, the pickup location evaluation module 134A may evaluate the pickup location score for the requested location by determining whether past requestors and matched providers had to communicate to coordinate the pickup. External communications (e.g., text messages, phone calls, emails, etc.) between requestors and providers to coordinate the pickup may be undesirable because it detracts from the convenience and functionality of the provided pickup service. The necessity for external communications may indicate that the request location transmitted to the provider may not be accurate or that the request location is not a convenient or easy location for the provider to identify (e.g., hidden driveway or entrance) or meet with the requestor (e.g., heavy traffic, results in blocking traffic, etc.). Thus, external communications between the requestor and the provider to facilitate a pickup may be an indication that the requested location is not an optimal location and therefore affect the pickup location score of the requested location. The external communications may be logged and stored as part of the previous ride history data and a rate of external communications for pickup locations may be determined and used to evaluate the pickup location score.

Other factors that may be considered by the pickup location evaluation module 134A to evaluate the pickup location score for the requested location include determining whether the matched provider actually stops at the location where the requestor is. The pickup evaluation module 134A may calculate a distance from the requested pickup location to the actual pickup location. For example, the requestor may end up walking around the block to actually get picked up by the provider because it may not have been possible for the provider to drive to the requested location where the requester was waiting. The requested location may be in a no-stopping zone, restricted to only certain vehicles, a high traffic, or in a construction zone, which could cause the actual pickup location to be in a different location from the requested location. Thus, the distance from requested location pickup to actual pickup may also be used to determine the pickup location score of the requested location. For example, an average distance that requestors walk from the requested pickup locations to the actual pickup locations may affect the pickup location score of that requested location. Weather conditions and other factors may also be considered, for example in inclement weather, it may be crucial for the actual pickup location to be at, or as close as possible to, the requested pickup location. In another example, the requestor may be handicapped or be carrying a lot of groceries and cannot easily get to another location from the requested pickup location. The average distance walked from requested pickup location to actual pickup location may also be converted to a time delay, and coupled into an overall trip delay, which may also affect the requested location pickup location score.

Additionally and/or alternatively, in some embodiments, the pickup evaluation module 134A may consider whether the provider can make a safe and legal stop to pick up the requestor. For example, the pickup evaluation module 134A may also account for a safety rating score based on historical incidents of accidents, collisions, police reports, and/or volume of traffic. Additionally or alternatively, a safety rating score may be incorporated into the pickup location score. There may be situations where the requested pickup location is a location where it is extremely dangerous for both the requestor and the provider; for example, an on-ramp or off-ramp to a main, high-traffic road or at a turn where oncoming traffic cannot easily see that a car is stopped ahead of them. In these situations, the pickup evaluation module 134A may determine that the requested location is not suitable by querying the curb database in the curb estimation system for a curb identifier and receive an indication that the curb segment is too dangerous. As a result, when a particular curb segment is identified as not safe, its pickup location score may be affected to indicate to the requestor that the requested location is unsafe or illegal for the provider to stop, identify the nearest alternate pickup location that is safe, and ask the requestor to move to that nearest alternate pickup location instead to reduce overall trip delay and ensure safety.

Additionally, in some embodiments, the pickup location score may incorporate a time-communication probability model involving a pickup location-specific expected value and/or a pickup location-specific probability. For example, the pickup location-specific expected value can be a function of time (e.g., tunable cost in seconds) of communication between provider and requestor. For instance, the pickup location-specific probability may include the probability that two conditions are met: (1) the time interval between provider arrival and requestor pickup (e.g., if the requestor had to walk from the requested pickup location to an actual pickup location) being below a certain threshold; and (2) there is no external communication between the requestor and the provider during the time interval between provider arrival and requestor pickup to coordinate where to conduct the pickup. The pickup location score may also be converted into a time metric; for example a better pickup location score may be indicated by time savings in the overall ride or an earlier estimated time of arrival to a requestor's final destination.

Other factors that may be considered by the pickup location evaluation module 134A to evaluate the pickup location score for the requested location include determining a number of cancellations associated with that pickup location. The cancellation may be either initiated by the provider or the requestor, and can affect the location score of the pickup location to indicate whether it is prone to cancellations because of inaccessibility (e.g., windy dark road in the hills), difficulty in finding the location (e.g., hidden store front in a large parking lot), difficulty in stopping (e.g., a single lane high-traffic street with no shoulder), etc. Many other factors may be considered by the pickup location evaluation module 134A to determine the pickup location score of the requested location, including, but not limited to any factors, parameters, or data associated with the requestor, the provider, history data, real-time traffic data, environmental data, statistical traffic probabilities, and/or any other data in determining whether a pickup location is suitable, efficient, convenient, and optimal for the requestor and provider.

In another embodiment, instead of calculating a pickup location score in real-time in response to a pickup request, the pickup location evaluation module 134A may receive a pre-calculated pickup location score from a location scoring system 610 for the various curb portions and/or streets within a region stored in location score database 614. The location scoring system 610 may include the location score database 614, which stores previously calculated pickup location scores for one or more regions, and may send the pickup location score to the pickup location evaluation module 134A in response to receiving a curb segment, location identifier, and/or other pickup location identification information. The location scoring system may identify one or more pre-calculated pickup location scores associated with one or more pickup locations associated with the received location identification information and return the one or more pickup location scores to the pickup location evaluation module 134. Thus, in some embodiments, the ride matching system 130 can utilize pre-calculated pickup location scores that have been generated before the request has been received. As such, the location scoring system 610 can retrieve a pre-calculated pickup location score from the location score database 614 and transmit it to the ride matching system 130 for evaluation by the pickup location evaluation module 134A.

Simultaneously and/or serially (either before or after the pickup location evaluation module 134A processing is initiated and/or completed), the travel time estimation module 134B may receive the transport request information and may identify available providers in the geographic area around the request location. The travel time estimation module 134B may use a threshold distance (e.g., 5 blocks, 200 yards, 10 miles, 15 miles, etc.), one or more zip codes or other geographic identifiers (e.g., streets, blocks, neighborhoods, city, region, etc.), or any other suitable geographic limitation to identify available providers relevant to a request location. For example, the travel time estimation module 134B may search the provider information data store 136B to identify any available providers that are located within a certain distance from the request location. The travel time estimation module 134B may also limit the search for available providers to those that meet ride request criteria such that the available provider can serve the request. For example, whether a provider vehicle is a sedan, luxury, SUV, or other type of car, has a particular type of feature or amenity (e.g., car seat, dog friendly, etc.), has a number of available seats (e.g., request for 2 people, etc.), and/or may use any other stored information at the ride matching system to limit available providers to those that can serve the request.

Once the travel time estimation module 134B identifies the available providers in the area, the travel time estimation module 134B may calculate an estimated travel time for each of the providers from their current location to the request location. As discussed above, the travel time estimation module 134B may incorporate traffic, weather, road closures, and/or any other conditions that may affect travel time into the estimation. The travel time estimation module 134B may use historical ride data that is relevant for the time of day, streets and geographic region, as well as stored previous rides over those times, areas, road conditions, and/or any other information to obtain an estimate for the provider to travel from their current location to the request location. For example, the travel time estimation module 134B may be configured to obtain the location of each of the provider computing devices. The travel time estimation module 134B may be configured to identify the request location and map navigation routes for each of the providers and the requestor to the request location. The travel time estimation module 134B may calculate an estimated time of arrival for a variety of different routes based on navigation information obtained from a navigation data store 136D. The navigation information may include real-time and historical traffic information, historical travel time information, known routes for a geographic area or region, traffic rules, and/or any other suitable information for mapping and/or identifying potential routes for traveling from one location to another based on a type of transportation (e.g., driving, biking, sailing, flying, etc.).

The travel time estimation module 134B may map a plurality of possible routes from the provider location to the request location as well as the alternate request locations and generate an estimated arrival time for each of the potential mapped routes. The travel time estimation module 134B may select the fastest route and/or the most probable route for each of the providers and the corresponding estimated travel time for that route as the estimated travel time for the provider. The travel time estimation module 134B may incorporate current traffic conditions, road closures, weather conditions, and any other relevant travel time related information to calculate an estimated arrival time for the provider. The estimated arrival time may also be calculated by taking an average of the arrival time of each of the mapped routes, selecting the estimated arrival time for the fastest route, receiving a selection of one of the potential routes by the provider, identifying the route being taken based on the route being used by the provider, and/or through any other suitable method. If the provider makes a wrong turn and/or follows a different route than that calculated by the travel time estimation module 134B, the travel time estimation module 134B may obtain the updated location of the provider computing device and recalculate the possible routes and estimated arrival times. As such, the estimated travel times may be updated as travel and road conditions, weather, etc. are updated. Accordingly, the travel time estimation module 134B may determine a navigation route associated with the request location and an estimated travel time for each of the providers. Further, the estimated time may be determined through any suitable method including taking an average of multiple routes, selecting the fastest route, adding additional cushion time when certainty is low for the estimate of the time, etc. Accordingly, the travel time estimation module 134B may determine an estimated travel time for each of the available providers in the area that may potentially match the request.

Additionally, the travel time estimation module 134B may determine an arrival time for the requestor to one or more of the request location and/or alternate request locations. The arrival time for the requestor may be dependent on a travel time as well as a request time that may have been provided in the request. For example, the travel time may be determined by determining an estimated travel time from the current location of the requestor to the request location. The travel time may be estimated by searching the requestor information data store 136A for previous time estimates associated with the route and/or the historical ride data store 136C for relevant travel times associated with the route. The requestor travel time may be determined based on walking speed and may use the navigation data store 136D to identify the travel time associated with walking from different locations. Additionally, where the requestor is located in a building, the travel time estimate may incorporate average travel times for requestors in those buildings to leave the building in order to improve the accuracy of the time estimate. Additionally, the requestor arrival time may have a request time component that is dictated by a delay input by the user into the application upon requesting the ride. For example, the requestor may need another 10 minutes before they are ready to leave but may request the ride so that they know they will be matched with a provider upon being ready to leave. Accordingly, the requestor may request that the ride be scheduled for 10 minutes, an hour, a day, or any other relevant time in the future. Accordingly, the arrival time may have both a travel time and a request time component.

In some embodiments, the travel time and the request time may be added together or may be used separately. For example, if the request is for 10 minutes away and is for a location near the user the requestor arrival time may just be the 10 minute wait. However, if the user asks for a scheduled ride at a request location that is down the block and the system determines that the user is not walking toward the request location when they should have already left, the travel time can be added to the request time as well to ensure an accurate match.

Additionally, in some embodiments, the travel time estimation module 134B may obtain all the travel estimates for the providers and the requestor by requesting estimates from a third party mapping service. For example, the travel time estimation module 134B may call an API associated with the third party mapping service such that a request location, current location of the requestor, current locations of the providers, and the request time are provided to the third party mapping service. The mapping service may perform the actual estimation of the routes and return the estimates to the travel time estimation module 134B for use in selecting a provider for the match. Either way, the travel time estimation module 134B may return the travel time estimates for the available providers and the requestor to the ride matching module 133 for further match processing. Similarly, in some embodiments, the pickup location scoring functionality described herein may be provided by a third-party location scoring service and the location scores and/or a recommended location based on pickup location scores may be incorporated into the matching process, as one of ordinary skill in the art would recognize.

The ride matching module 133 may then provide the estimated travel times for the providers and the requestor to the provider selection module 135. The provider selection module 135 may obtain the estimated travel times and may select one or more providers that should be matched with the request. Accordingly, the provider selection module 135 may generate a dynamic provider eligibility model that incorporates both the estimated requestor arrival time and the estimated provider times of each of the providers to identify those available providers that are eligible for a match. Thus, as described above, the provider selection module 135 may identify those provider travel times that are more than the requestor arrival time but less than a threshold travel time in order to identify eligible available providers to match to the request. The provider selection module 135 may then select a subset of the eligible available providers and select one of the providers based on system efficiency, rankings, route, arrival time, and/or any other suitable information that can be used for matching. For example, two available providers may be identified as eligible for a request where one of the providers is traveling away from the request location while the other is traveling toward the request location. The provider selection module 135 may select the provider that is traveling toward the request location because it causes less driving, fewer turns, safer driving, and all the other benefits of allowing providers to maintain their current direction of travel.

Additionally, in some embodiments, the provider selection module 135 may perform available provider prediction to ensure that the best possible match is being made. For instance, the provider selection module 135 may obtain an available provider rate associated with the request location from a historical ride data store 136C that may indicate the historical rate of available providers coming online near the request location. For example, some areas may have a high rate of providers coming online during particular times that the ride matching system may use to predict available providers near the request location. For requests that have relatively large requestor arrival times outstanding (e.g., 5+ minutes) and a high rate of predicted available providers, the system may delay matching to an eligible provider even if there are multiple providers that are available and eligible for a request in order to ensure that the a more efficient system match does not arise. Additionally, the ride history data store 136C may be consulted for existing rides that have providers that will be dropping off requestors in the area before the requestor arrival time is up. For instance, if a request is received for a busy area where a number of different providers with requestors are dropping off previously matched requestors and/or where new providers are known to become active during the time frame of the requestor arrival time, the provider selection module 135 may delay matching to see if a provider becomes available in the area that is closer than the existing eligible providers for the request. The ride matching module may repeat the process and monitor the status of the available and matched providers in the area along with the progress of the requestor toward the request location to ensure that a well-matched and eligible provider is matched to the request before the requestor arrives at the request location. Accordingly, by tracking and monitoring system activity as well as using estimated arrival times for the providers and requestor over time, the system can more efficiently and effectively match provider resources with requestor resources to ensure the most efficient matching of resources.

In another embodiment, the pickup location evaluation module 134A may be coupled to the ride history store 136C to determine the pickup location scores for the respective locations using a multi-factor probability model. The ride history data store 136C may include aggregated data on pickup location scores of multiple locations, time delays associated with those locations, as well as other factors associated with the provider and/or requestor. Thus the more ride history data there is stored in the ride history data store 136C, the more accurate the multi-factor probability model can be in predicting how suitable a particular request location is for pickup. Other pickup factors that may be included either in the pickup location score calculus and/or stored in the ride history data store 136C can include distances from the requested location to a nearby intersection, road segment type (e.g., highway, local road), speed limit, number of lanes in the road, road directionality (e.g., one way), mean historical traffic speed, posted regulations (e.g., no-stopping zone, bike lane, bus lane, no shoulder, etc.), and/or type of intersection (e.g., traffic lights, 4-way stop, crosswalk, roundabout, etc.). Additionally, in some other embodiment, the pickup location evaluation module 134A may use a combination of the time-communication probability model and the multi-factor probability model to calculate respective pickup location scores for various locations. In another embodiment, depending on the geographical area, one probability model may be used over the other. For example, in urban cities with many factors involved, the multi-factor probability model may be better suited in determining accurate pickup location scores, while in rural areas, the simpler time-communication probability model may be sufficient in determining pickup location scores.

The ride matching module 133 may provide the ride request to the provider interface 132 with the provider contact information or provider identifier so that the ride request may be sent to one or more available providers. The ride matching module 133 may send the ride request and/or the information from the ride request to one or more of the selected available providers to determine whether the available providers are interested in accepting the ride request. The one or more available providers may receive the ride request through the provider application 151 of the provider computing device 150, may evaluate the request, and may accept or deny the request by providing an input through the provider application 151. A ride response message may be sent to the ride matching system 130 indicating whether a ride was accepted and including a provider identifier, a location of the provider, and/or any other suitable information to allow the ride matching system 130 to process the response. Alternatively, the provider may ignore the request and after a predetermined period of time, the request may be considered denied and a corresponding ride response message may be sent to the ride matching system 130. In some embodiments, no response may be sent unless a ride request is accepted and the ride will be assumed to be denied unless a response is received from the provider. In other embodiments, no response is necessary and the ride may be immediately accepted. An indicator, flag, and/or other information may be passed back to the ride matching system to assure the system that the provider computing device received the request.

The ride matching module 133 may receive the ride response, evaluate whether the provider accepted or declined the request, and may either find additional available providers for the request (if declined) or determine the ride request has been accepted and send matched ride information to the requestor computing device 120 and the provider computing device 150. The matched ride information may include provider information, requestor information, the pick-up location, the current location of the provider computing device, the current location of the requestor computing device, an estimated time of arrival for the provider, and/or any other suitable information to allow the requestor and the provider to complete the requested service. The ride matching module 133 may update the historical ride data store 136C with the corresponding matched ride information for the matched ride. Accordingly, the ride matching module may perform more efficient and effective matching of requests with providers.

A curb estimation system 602 may be provided as a separate system or as part of the ride matching system 130, and vice versa. A curb estimation module 604 may utilize various data stores that may be part of the curb estimation system 602 and/or communicatively coupled with the curb estimation system 602, such as infrastructure data 606. For example, infrastructure data 606 may comprise road data, building data, local features (e.g., fire hydrants, no stopping zones, loading only zones, etc.), among other examples. The curb estimation module 604 may utilize the data as discussed earlier; for example, to determine curb segments within a geographic area. Once the curb segments are determined, curb segment data may be stored, for example in curb database 608.

A location scoring system 610 may be provided as a separate system or as part of the ride matching system 130, and vice versa. A location scoring module 612 may utilize various data stores that may be part of the location scoring system 610 and/or communicatively coupled with the location scoring system 610, such as historical ride data 136C. For example, historical ride data 136C may comprise a data set of requests and matched rides that have been serviced by the ride matching system 130 and/or any other third party ride data source. For instance, the historical ride data 136C may include any information received from a transport request (e.g., user identifiers for requestors, request location, destination location, a location of the requestor and provider when the request was made, etc.) and any information associated with the transport request (e.g., a current location of the provider and/or requestor as the ride matching process progresses, a result of the transport request (e.g., canceled, completed, etc.), feedback after the request is completed, the day, date, and time of the request, weather at the time of the request, and any other information that can be captured, stored, and tracked associated with the transport request). The location scoring module 612 may utilize the data as discussed earlier; for example, to determine pickup location scores for a request location as well as alternate request locations within a geographic area.

The location scoring module 612 may determine pickup location scores through any suitable process. For example, as discussed herein, the pickup location scores may be based upon whether there was (1) a communication between the requestor and provider, (2) whether the requestor had to walk a long distance to find a provider (e.g., from indicated pickup location to actual pickup location), and (3) time between provider arrival and actual requestor pickup (e.g., time to meet: for situations when the requestor was not immediately present and/or when the provider cannot locate the requestor).

In some embodiments, the location scoring module 612 may also have access to the curb segment data and use the curb segment data to create a uniform addressing and/or reference mapping system for the pickup location scoring. The pickup location scores may be stored, for example in a location score database 614 according to curb segment data (or with a reference to the curb segment identifiers). Further, the location scoring system 610 may maintain and process the pickup location scores for the available curb segment data periodically, upon a trigger, and/or using any other processing scheme such that the pickup location scores are ready to be provided for a request location upon a request being received for a request location. Alternatively and/or additionally, the pickup location scores may be generated upon a request being received using the historical ride data 136C.

Figure 7:
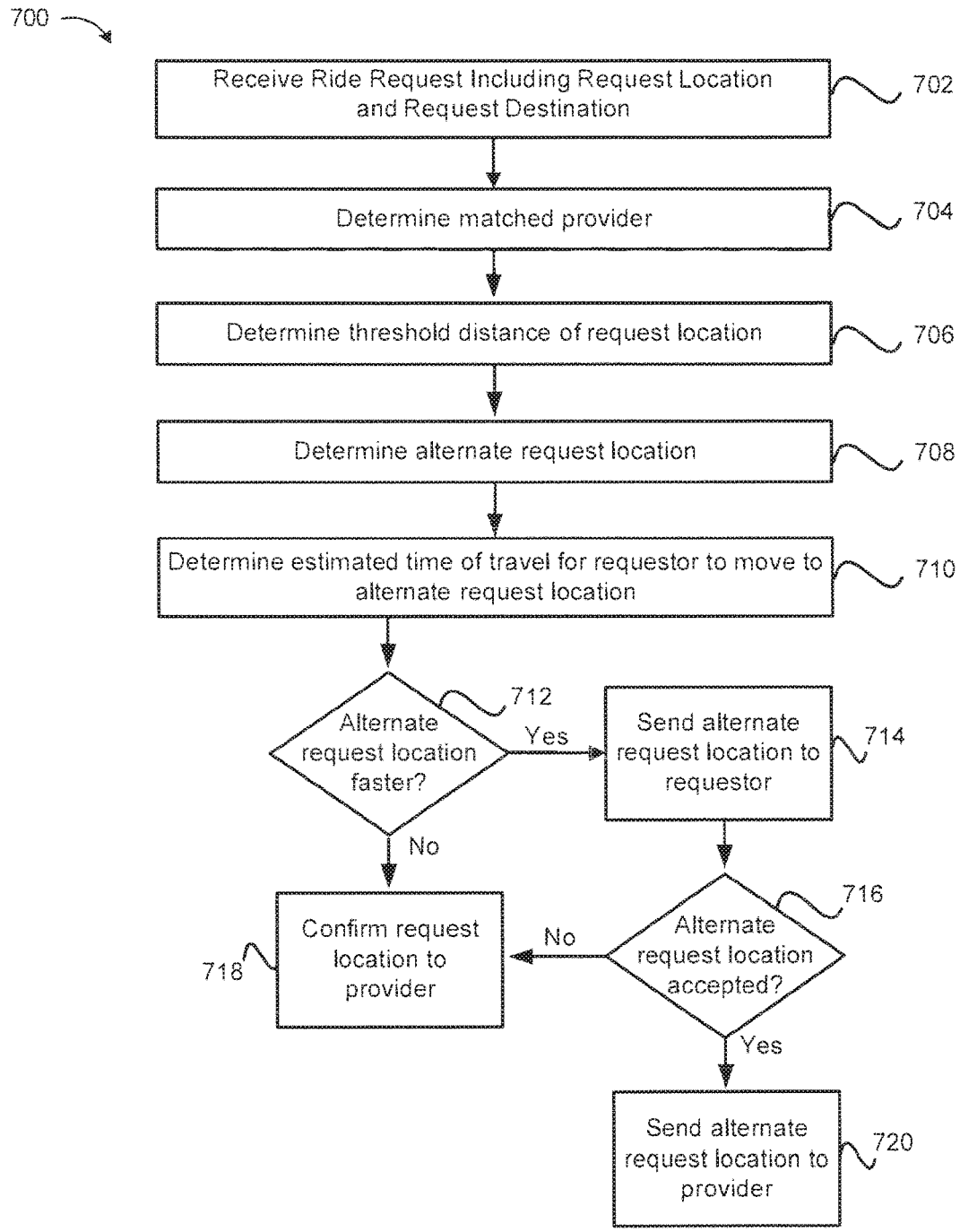
FIG. 7 illustrates an exemplary flow diagram of a method for using curb segment data to provide an optimized pickup location, in accordance with embodiments of the present techniques.

FIG. 7 illustrates an exemplary flow diagram of a method for using curb segment data to provide an optimized pickup location, in accordance with embodiments of the present techniques. At step 702, the dynamic transportation matching system receives a ride request from a requestor computing device. The ride request may include data (e.g., transport request information) including a request location (i.e., pick-up location) for the ride request, a request destination (i.e., a drop-off location), a request time, a requestor identifier, a requestor computing device location, and/or any other relevant information associated with the ride request and/or requestor.

At step 704, a provider is matched to the transport request, for example based on the transport request information. In an embodiment, the matching system determines the closest provider to match with the request, although in some embodiments, a provider match may be made using any suitable criteria including distance, rating, existing travel route, and/or any other suitable information. In an embodiment, the matched provider is determined based on a first estimated time to destination (ETD), which is the time it would take the particular provider to travel to the request destination, which may or may not include an estimated time of arrival (ETA) of the provider to the request location.

At step 706, a threshold distance of the first request location is determined. For example, a uniform radius surrounding the request location may be established; in other examples as discussed earlier, various data may be utilized to modify the boundaries and/or distance corresponding to the threshold distance.

At step 708, an alternate request location is determined. In an embodiment, multiple alternate request locations are determined, for example within the threshold distance of the request location. In an embodiment, the alternate request locations correspond to curb segments within the threshold distance, as defined by intersection points such that an alternate request location corresponds to points around each intersection point. For example, where two roads intersect, there may be eight intersection points of corresponding curb segments, as may be seen in FIG. 3 at the intersection of Main Street and 1$^{st}$ Avenue. In various embodiments, more or fewer intersection points and/or alternate request locations may correspond to each intersection of roads. In an embodiment, a subset of all alternate request locations within the threshold distance may be selected, for example based on manual selection by a requestor, automatic selection based on data corresponding to the requestor, road data, geographic data, weather data, etc.

At step 710, an estimated time of travel (ETT) for the requestor to move from the original request location to each of the alternate request locations is determined, although in various embodiments, fewer than all of the alternate request locations are part of the determination. The ETT may take into account various data corresponding to the requestor such as average walking speed, age, etc., as well as other data as described earlier such as road data, geographic data, weather data, etc.

At step 712, a determination is made whether any of the alternate request locations result in a more efficient ETD to the destination (e.g., faster time, shorter route, fewer turns, less traffic, etc.). For example, the original request location is associated with an original ETD. In an embodiment, for at least one of the alternate request locations, the ETT of the requestor to the alternate request location is added to a new ETD corresponding to the alternate request location. If the total time is less than the original ETD from the original request location, then the alternate request location is selected. In an embodiment, multiple alternate request locations may have a faster ETD than the original request location, in which case a user may select one or it may be dynamically selected based on various data as discussed herein.

If none of the alternate request locations are faster, then the original request location is confirmed at step 718. If the alternate request location is faster, then control passes to step 714 where modified transport request information including the alternate request location is sent to the requestor. At step 716, it is determined whether the alternate request location is accepted by the requestor. If not, then control passes to step 718 where the original request location is confirmed. If so, then control passes to step 720 where modified transport request information including the alternate request location is sent to the requestor. In an embodiment, if there are multiple alternate request locations that are faster than the original request location, and the requestor refuses one, then another alternate request location may be presented to the requestor for acceptance or refusal; for example, the second-fastest alternate request location that is faster than the original request location.

In an embodiment, there may be multiple requestors that are sharing a provider; for example, a requestor may have a matched provider going to a destination, and another requestor asking to be picked up along the route to the destination may be picked up and the two requestors share costs of the trip. Various embodiments include modifications of this concept. For example, a requestor may make a transport request, match a provider, and accept an alternate request location in order to make the journey shorter, as discussed herein. Another requestor may make a transport request having a request location within a threshold distance of the other requestor's alternate request location. If it is determined that an ETT for the second requestor to travel to the alternate request location is within a threshold amount of time of the first requestor's ETT, then modified transport information may be sent to the provider indicating that the second requestor will be picked up at the alternate request location. For example, the original requestor may take 5 minutes to walk to his accepted alternate request location. The other requestor may take 7 minutes to walk to the accepted alternate request location. If the extra two minutes are acceptable (e.g., are within the threshold time, as may be defined by the original requestor, or if the amount of time is affirmatively accepted by the original requestor regardless of the threshold amount of time, etc.), then the provider will wait after picking up the original requestor for the other requestor to arrive at the pickup location (i.e., the alternate request location).

In an embodiment, the other requestor may include a destination with their request different from the original requestor's destination. The provider's ETD to the new requestor's destination is determined, along with one or more alternate destination locations to the original requestor's destination. An ETD of the provider to the other requestor's destination from one of the alternate destination locations is determined, and if that ETD is less than the original ETD to the new requestor's original destination, then modified transport information including the alternate destination location is sent to the matched provider. For example, the original requestor is going to location A and the ETD is 5 minutes. The other requestor is going to location B and the ETD, including the travel to location B from location A (because the original requestor is being dropped off first) is 10 minutes. It is determined that location C is within a threshold distance of location A, and that the ETD for the other requestor with location C instead of location A is 7 minutes. If that three minute improvement is within the threshold amount, then location C is used as the dropoff point for the original requestor. In an embodiment, the original requestor's computing device will display mapping data including a navigation route from location C to location A (e.g., a walking route) along with an ETT for the original requestor to travel from location C to location A. and an indication is received of the original requestor's acceptance or denial of the change.

Figure 8:
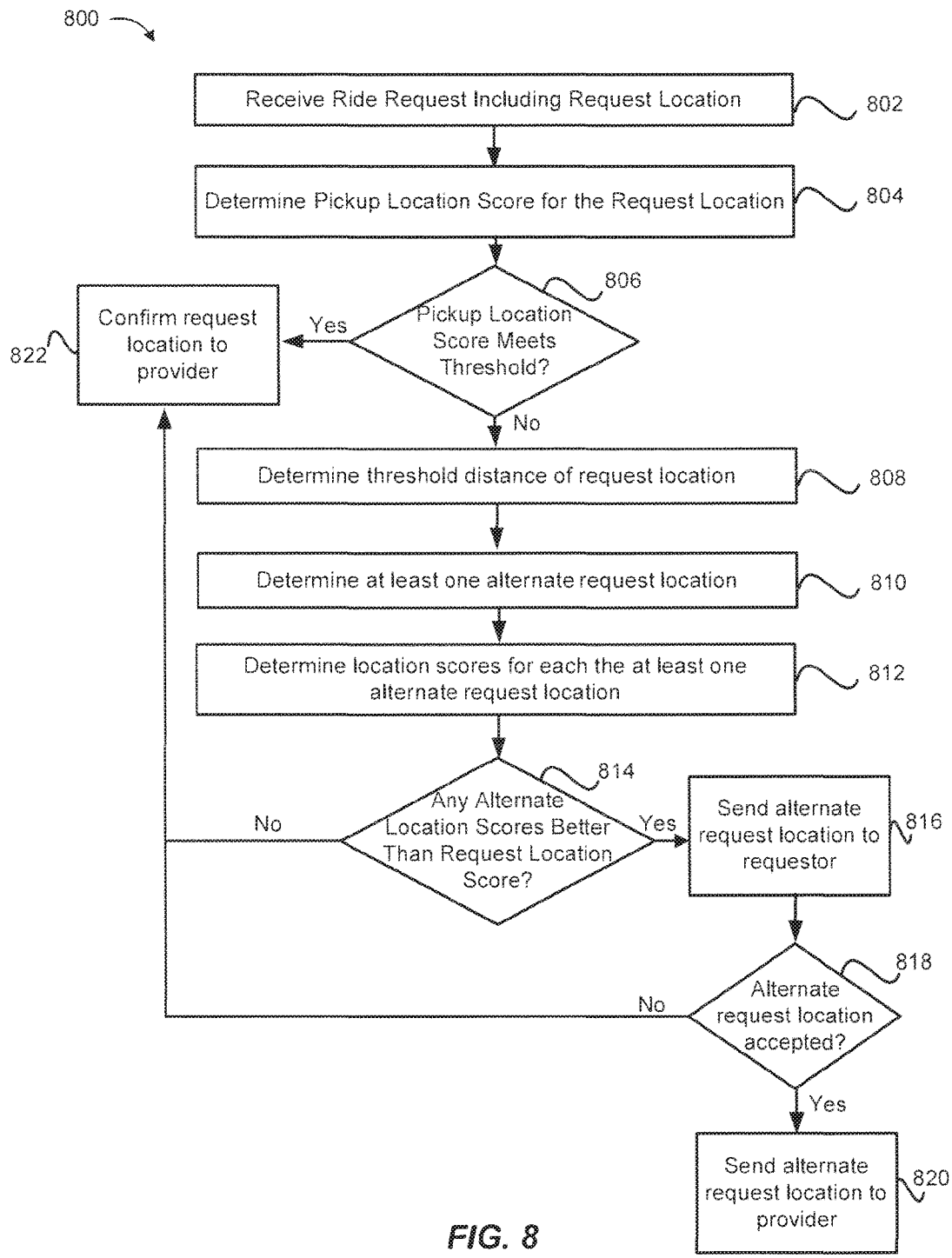
FIG. 8 illustrates an exemplary flow diagram of a method for using a pickup location score of a request location and alternate request locations to determine a modified pickup location for a request, in accordance with embodiments of the present techniques.

FIG. 8 illustrates an exemplary flow diagram of a method 800 for using a pickup location score of a request location and alternate request locations to determine a modified pickup location for a request, in accordance with embodiments of the present techniques. At step 802, the location evaluation module of the dynamic transportation matching system may receive the transport request information including the request location for the request. The ride request may include data (e.g., transport request information) including a request location (i.e., pick-up location) for the ride request. In an embodiment, the ride request may also include, in addition to the request location, a request destination (i.e., a drop-off location), a request time, a requestor identifier, a requestor computing device location, and/or any other relevant information associated with the ride request and/or requestor.

At step 804, the location evaluation module of the dynamic transportation matching system may determine a pickup location score for the request location. The picking location score (PLoS) of a request location may be determined by the location evaluation module of the dynamic transportation matching system. The PLoS may indicate a fitness of the request location, the fitness including any objective quantitative measurement the location as being optimal, efficient, and convenient for an interaction between a requestor and a provider. The fitness of the location can result in reduced wait time for the requestor, while increasing efficiency and productivity for the provider, and increasing overall resource allocation of the dynamic transportation matching system. For example, the pickup location score may characterize the roads, blocks, sub-blocks, and/or any other suitable segments of a map corresponding to locations for fitness of a pickup of a requestor by the provider at the corresponding location. As such, pickup location scores may be used to identify particularly good locations within a region, road, block, sub-block, etc. for interactions between requestors and providers. For example, there may be a specific traffic zones, such as a no-stopping any time area, which may affect whether that location is suitable and convenient for pickups.

According to various embodiments, the pickup location score may be based on rates of contact between providers and requestors for matched rides at a particular request location (e.g., a percentage of rides associated with the request location that result in one of the parties contacting the other party before a pickup), an average travel distance of a requestor to a provider for a matched ride to be initiated for a particular request location (e.g., a difference between a request location and the actual location that the requestor was picked up), and/or a delay time measured between a time of arrival by a provider at a request location and a time of arrival of the requestor to the provider for the start of the matched ride (e.g., how long it took for the requestor and driver to find one another). Additionally, cancelation rates of matched rides associated with a request location and any other information associated with delay between a provider and a requestor that can be associated with a poor location for a pickup may be used in determining a pickup location score for a location. Additionally, the dynamic transportation matching system may collect, aggregate, and analyze ride history for requests between a requestor and a provider through the dynamic transportation matching system. Statistics and patterns may be generated from analyzing the stored ride history information and may be used to build a pickup location score (PLoS) model that can be applied to any request location. The pickup location scores may be time dependent such that a pickup location score for a particular location during a specific time (e.g., morning commute) may be different than a pickup location score for the same location during another time (e.g., afternoon). Accordingly, the stored ride history may be stored and used to generate different pickup location scores for a location according to environmental variables. Environmental variables that may be used to calculated pickup location scores may include time, season, weather conditions, road conditions, and/or any other variables that may affect traffic flow and/or pickup conditions of a location.

At step 806, the location evaluation module of the dynamic transportation matching system may compare the pickup location score to a pickup location score threshold to determine whether the pickup location score meets the pickup location score threshold. When the pickup location score for that pickup location meets that threshold value, the location may be identified as a suitable pickup location for the request. The pickup location score threshold may be used to filter the pickup request location and other potential alternate request locations that may be used in optimizing a pickup location for travel time or arrival time to a destination but the pickup location score values may not be compared to one another to identify the best possible location. Instead, the location and navigation route of the provider may impact the alternate pickup location that is selected as a modified request location for the request. If the pickup location score meets the threshold value, then at step 820, the request location is confirmed with the provider.

If the pickup location score of the request location does not meet the pickup location score threshold, then control passes to step 808, where the location evaluation module of the dynamic transportation matching system may determine that alternative request locations should be identified. As such, the location evaluation module of the dynamic transportation matching system may determine a threshold distance of the request location. The threshold distance may be identified as a radial distance from the request location (e.g., 1 mile, 2 miles, 10 miles, 15 miles, etc.), one or more zip codes or other geographic identifiers (e.g., streets, blocks, neighborhoods, city, region, etc.), or any other suitable geographic limitation to identify available providers relevant to a request location.

At step 810, the location evaluation module of the dynamic transportation matching system may determine at least one alternate request location within the threshold distance of the request location. The threshold distance around the request location may be determined, and a set of alternate request locations may be evaluated within the threshold distance such that at least one alternate request location is identified. The alternative request locations may be identified based on any suitable process as described in reference to FIGS. 3 and 5A-5D above or through any other suitable methods for sampling potential locations around the request location. In some embodiments, the at least one alternate request location may be determined based on whether the at least one location reduces one of an ETA or ETD, or both, by a particular amount over the original route.

At step 812, the location evaluation module of the dynamic transportation matching system may determine location scores for each of the at least one alternate request locations. When determining alternate request locations surrounding the request location, the system may determine pickup location scores associated with alternate request locations. The pickup location scores associated with the alternate request locations may be determined and ranked to determine the best possible alternate request locations for the request.

At step 814, the location evaluation module of the dynamic transportation matching system may compare the pickup location scores of the at least one alternate request locations to the request location score to determine whether any of the at least one alternate request locations have a better location score than the original request location. In some embodiments, the highest possible pickup location may be determined for the request and used as an alternate request location for a request. If the alternate location score is better (e.g., higher) than the request location score, then the alternate location is sent to the requestor in step 816. However, if the alternate location has a worse (e.g., lower) pickup location score than the original request location, then the original request location is confirmed to the provider at step 820.

At step 816, if any of the alternate location scores are better than the request location score (e.g., higher score when the scoring is based on a positive scale), the location evaluation module of the dynamic transportation matching system may return an alternate request location of the at least one alternate request locations to the dynamic transportation matching system. The dynamic transportation matching system may send the alternate request location to the requestor computing device for evaluation by the requestor as to whether they are willing to move the request location to the alternate request location for time savings and/or an improved interaction experience with the provider.

At step 818, the dynamic transportation matching system may determine whether the alternate request location is accepted. The requestor may accept or decline the modified request location and may provide feedback through the requestor application on their computing device that is sent to the dynamic transportation matching system for processing. The dynamic transportation matching system may determine whether the user accepted or declined the modified request location.

At step 820, if the requestor declined or did not accept the modified request location, the dynamic transportation matching system may confirm the initial request location to the provider and/or not provide any updated location to the provider computing device. However, in some embodiments, the dynamic transportation matching system may perform one or more actions to minimize the delay and/or unfavorable conditions of the original request location. For example, the dynamic transportation matching system may send an arrival message before the provider has arrived at the location to allow the requestor more time to find the provider and/or may alert the requestor that the location is associated with delays and advise particular ways that the requestor can minimize those delays (e.g., leave early, contact the provider, etc.).

At step 822, if the requestor accepted the modified request location, the dynamic transportation matching system may send the modified request location to the provider computing device for routing and transportation to the modified request location.

Figure 9:
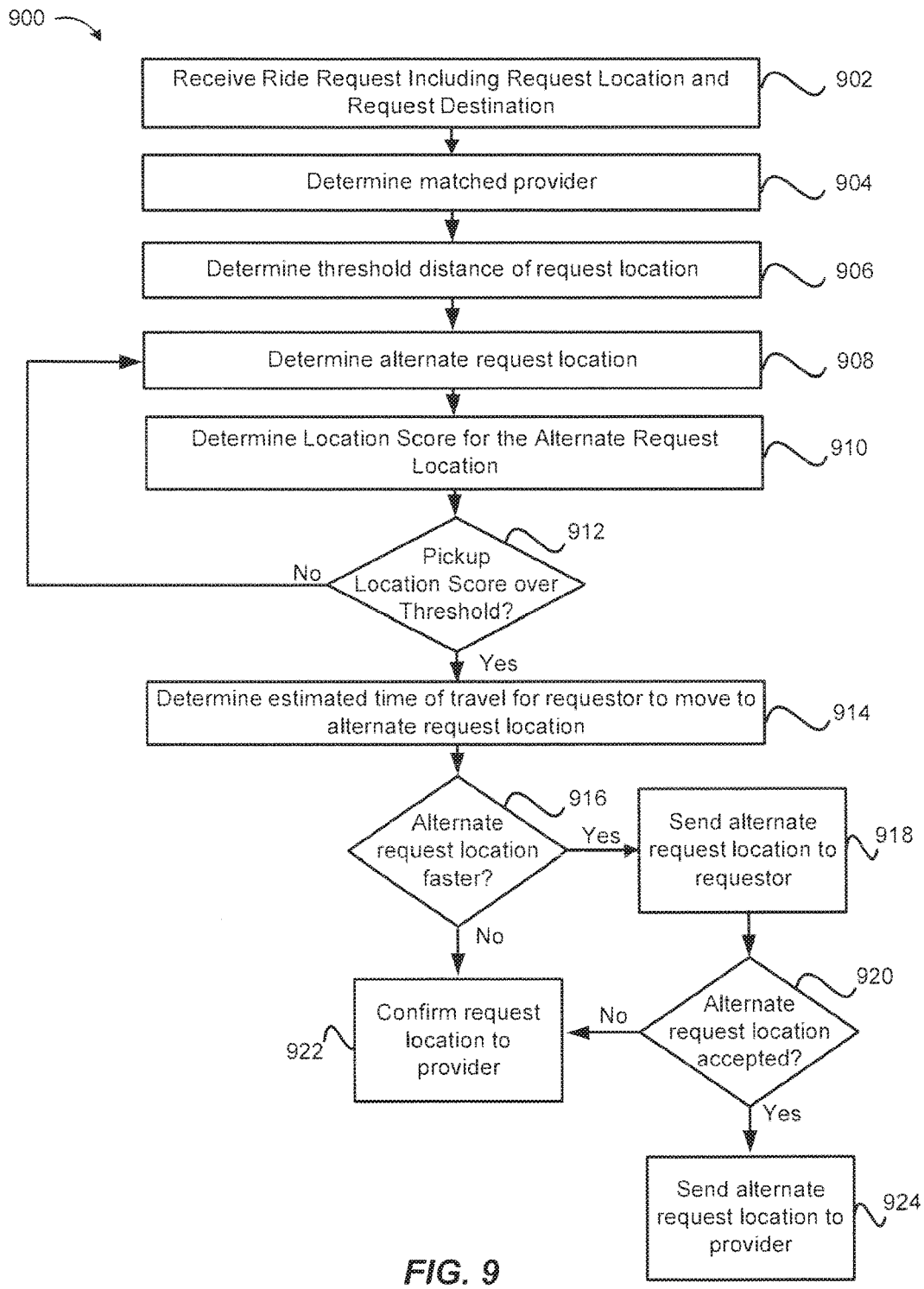
FIG. 9 illustrates an exemplary flow diagram of a method for using location scores as a filter to identify alternate request locations in order to provide an optimized pickup location, in accordance with embodiments of the present techniques.

FIG. 9 illustrates an exemplary flow diagram of a method 900 for using location scores as a filter to identify alternate request locations in order to provide an optimized pickup location, in accordance with embodiments of the present techniques. Many of the steps of FIG. 9 are similar to those of FIGS. 7 and 8. Thus, only those steps that are different are explicitly discussed below and additional information regarding the remaining steps may be found in reference to at least FIGS. 7 and 8.

Steps 902-908 of FIG. 9 are similar to steps 702-708 of FIG. 7. At step 902, the location evaluation module of the dynamic transportation matching system may receive the transport request information including the request location for the request. At step 904, a provider is matched to the transport request, for example based on the transport request information. At step 906, a threshold distance of the first request location is determined. For example, a uniform radius surrounding the request location may be established.

At step 908, an alternate request location is determined. In an embodiment, multiple alternate request locations are determined, for example within the threshold distance of the request location. At step 910, the location evaluation module of the dynamic transportation matching system may determine location scores for each of the at least one alternate request locations.

According to an embodiment in which pickup location scores are used as a filter to identify alternate request locations in order to provide an optimized pickup location, at step 912, the location evaluation module of the dynamic transportation matching system may compare the pickup locations scores of the at least one alternate request locations to the request location score to determine whether any of the at least one alternate request locations exceeds a predetermined threshold value. For the alternate locations to be considered as valid pickup locations, the system determines whether the pickup location scores of the alternate locations meet the threshold value. When the pickup location scores meet the threshold value, the alternate location can be identified as a suitable alternate pickup location for the request, and the system continues to step 914. However, if the pickup location score of the alternate location does not meet the threshold score, then the system returns to step 908 to determine another alternate request location. The system may iterate through steps 908, 910, and 912 until an alternate location with a pickup location score that meets the threshold value is determined before the system can proceed to step 914.

The remaining steps 914-924 are similar to steps 710-720 in FIG. 7. At step 914, an estimated time of travel (ETT) for the requestor to move from the original request location to each of the alternate request locations is determined. At step 916, a determination is made whether any of the alternate request locations result in a more efficient ETD to the destination (e.g., faster time, shorter route, fewer turns, less traffic, etc.). At step 918, if the alternate request location is faster, then the modified transport request information including the alternate request location is sent to the requestor. If none of the alternate request locations are faster, then the original request location is confirmed at step 922. At step 920, it is determined whether the alternate request location is accepted by the requestor. If not, then control passes to step 922 where the original request location is confirmed. If so, then control passes to step 924 where modified transport request information including the alternate request location is sent to the requestor. In an embodiment, if there are multiple alternate request locations that are faster than the original request location, and the requestor refuses one, then another alternate request location may be presented to the requestor for acceptance or refusal; for example, the second-fastest alternate request location that is faster than the original request location.

Figure 10:
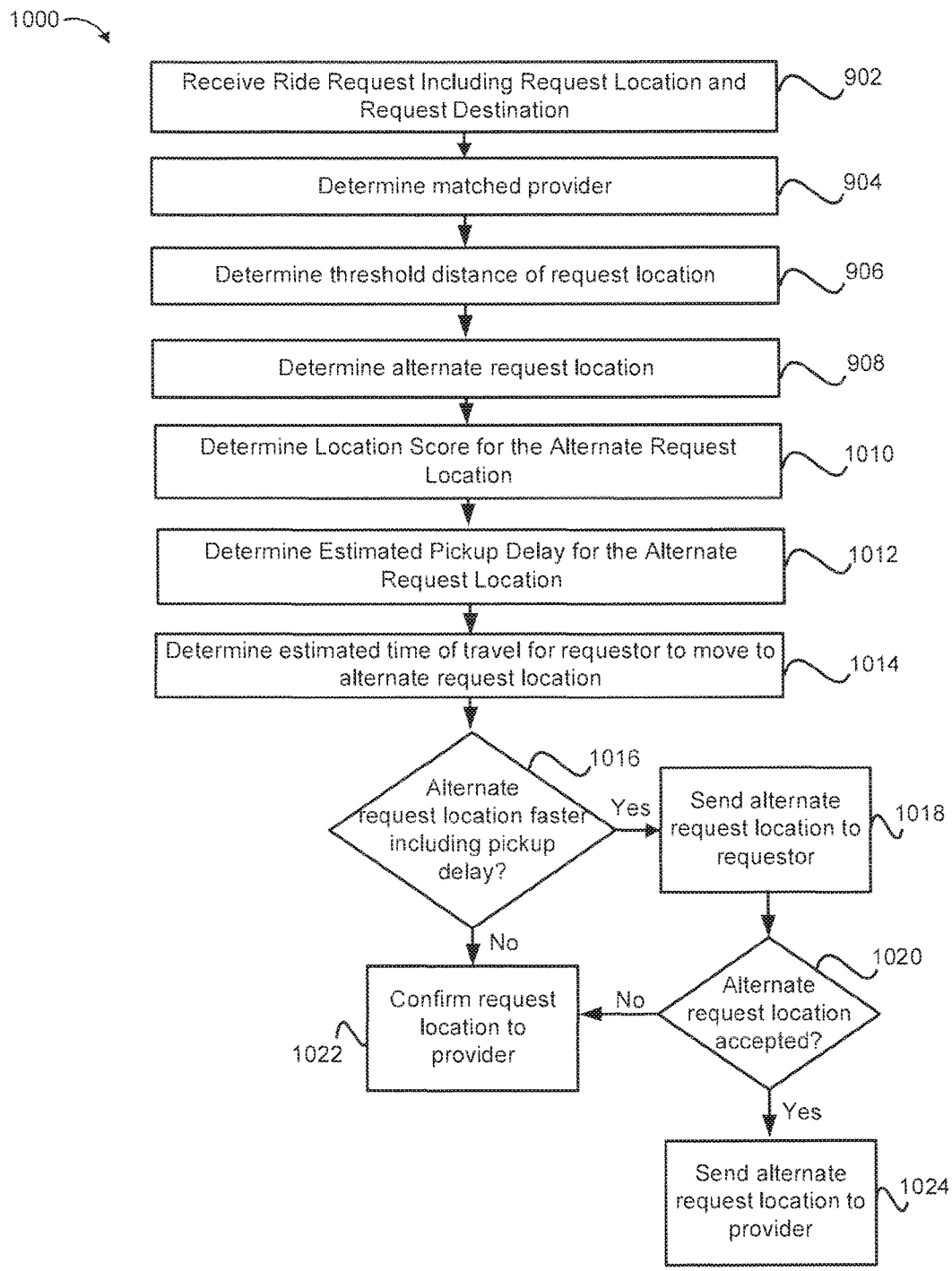
FIG. 10 illustrates an exemplary flow diagram of a method for using delay times associated with a location score to provide an optimized pickup location, in accordance with embodiments of the present techniques.

FIG. 10 illustrates an exemplary flow diagram of a method 1000 for using delay times associated with a location score to provide an optimized pickup location, in accordance with embodiments of the present techniques. Many of the steps of FIG. 10 are similar to those of FIGS. 7-9. Thus, only those steps that are different are explicitly discussed below and additional information regarding the remaining steps may be found in reference to at least FIGS. 7-9.

Steps 1002-1010 of FIG. 10 are similar to steps 902-910 of FIG. 9. At step 1002, the location evaluation module of the dynamic transportation matching system may receive the transport request information including the request location for the request. At step 1004, a provider is matched to the transport request, for example based on the transport request information. At step 1006, a threshold distance of the first request location is determined. At step 1008, an alternate request location is determined. In an embodiment, multiple alternate request locations are determined, for example within the threshold distance of the request location. At step 1010, the location evaluation module of the dynamic transportation matching system may determine location scores for each of the at least one alternate request locations.

According to an embodiment for using delay times associated with a location score to provide an optimized pickup location, at step 1012, the location evaluation module of the dynamic transportation matching system may determine a pickup delay for the alternate request location. Some request locations and alternate request locations may be more difficult for a provider to successfully locate and interface with a requestor due to traffic, obstacles, and/or the configuration of the road. For example, busy streets with parked cars on the curbs may be difficult to find a safe location for a pickup location. As a result, requestors may be forced to walk around the block to find a location where it was safe for a provider to park. This can delay the pickup interaction, require unnecessary communication between the provider and requestor, and/or lead to cancelations of requests where a reasonable location cannot be found. As such, the location evaluation module may determine a pickup delay based at least in part on traffic, obstacles, the configuration of the road, and/or other factors associated with the environment. For example, other environmental factors can include weather conditions, construction detours, or accidents.

The remaining steps 1014-1024 are similar to steps 914-924 in FIG. 9. At step 1014, an estimated time of travel (ETT) for the requestor to move from the original request location to each of the alternate request locations is determined, although in various embodiments, fewer than all of the alternate request locations are part of the determination. At step 1016, a determination is made whether any of the alternate request locations result in a more efficient ETD to the destination (e.g., faster time, shorter route, fewer turns, less traffic, etc.), including the estimated pickup delay. If the alternate request location including the estimated pickup delay is faster, then the modified transport request information including the alternate request location is sent to the requestor at step 1018. After the alternate request location is sent to the requestor in step 1018, then at step 1020 it is determined if the requestor will accept the alternate request location. At step 1016, if none of the alternate request locations including the estimated pickup delay are faster, then the original request location is confirmed at step 1022. At step 1020, it is determined whether the alternate request location is accepted by the requestor. If not accepted, then control passes to step 1022 where the original request location is confirmed. If the alternate request location is accepted, then control passes to step 1024 where modified transport request information including the alternate request location is sent to the requestor.

Note that although the present examples focus on on-demand ride-sharing applications, any suitable service may be performed using similar functionality. For example, delivery of services may have a similar process implemented to find the location of delivery of the service. Any suitable application associated with finding suitable locations for interactions between providers (whether autonomous providers, human providers, or any other types of service providers) and requestors (whether human, autonomous, or any other types of requestors) may implement embodiments described herein.

Figure 11:
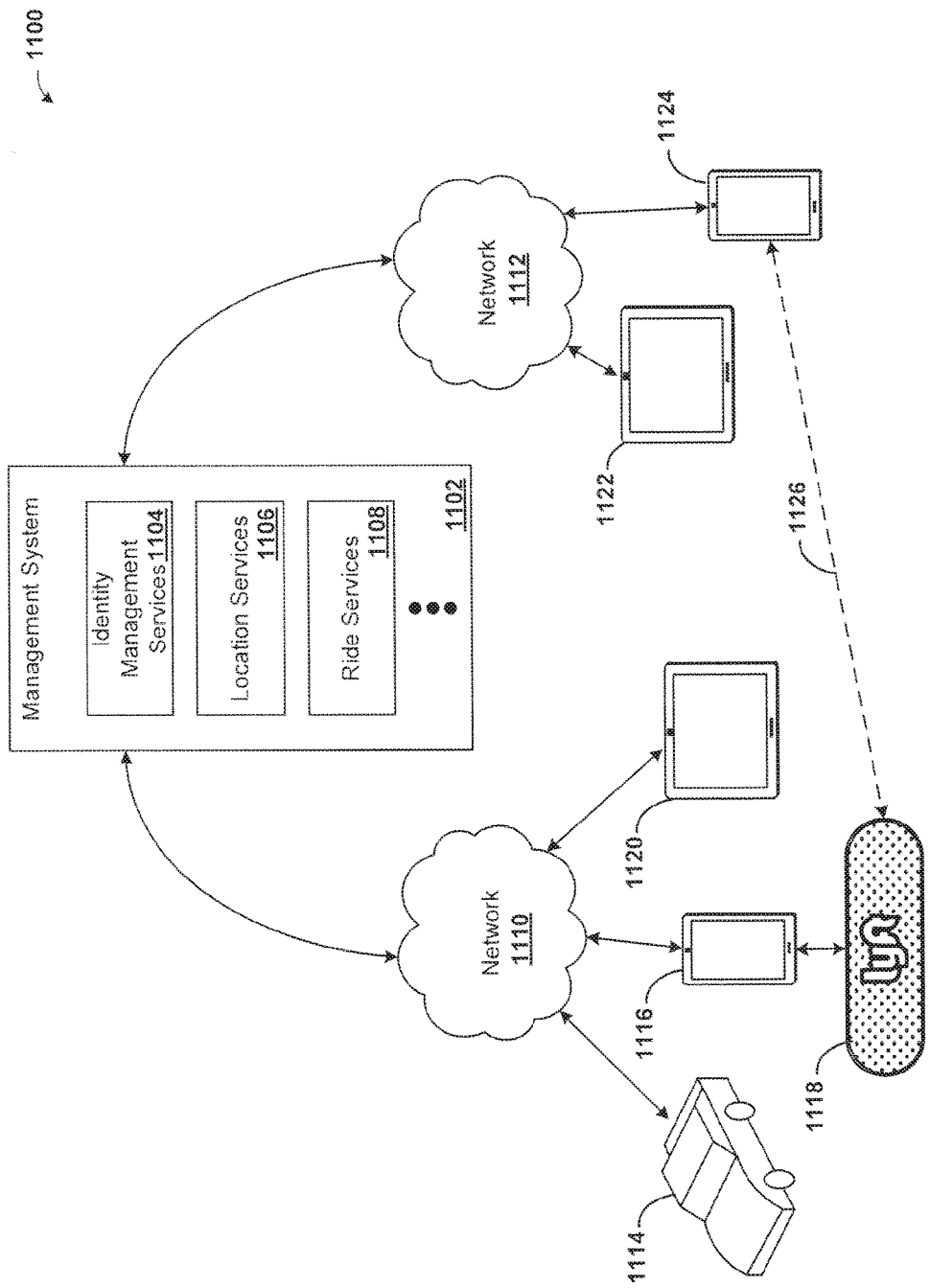
FIG. 11 illustrates an example requestor/provider management environment, in accordance with various embodiments.

FIG. 11 shows a requestor/provider management environment 1100, in accordance with various embodiments. As shown in FIG. 11, a management system 1102 can be configured to provide various services to requestor and provider devices. Management system 1102 can run one or more services or software applications, including identity management services 1104, location services 1106, ride services 1108, or other services. Although three services are shown as being provided by management system 1102, more or fewer services may be provided in various implementations. In various embodiments, management system 1102 may include one or more general purpose computers, server computers, clustered computing systems, cloud-based computing systems, or any other computing systems or arrangements of computing systems. Management system 1102 may be configured to run any or all of the services and/or software applications described with respect to various embodiments of the present techniques described herein. In some embodiments, management system 1102 can run any appropriate operating system as well as various server applications, such as common gateway interface (CGI) servers, JAVA® servers, hypertext transport protocol (HTTP) servers, file transfer protocol (FTP) servers, database servers, etc.

Identity management services 1104 may include various identity services, such as access management and authorization services for requestors and providers when interacting with management system 1102. This may include, e.g., authenticating the identity of providers and determining that the providers are authorized to provide services through management system 1102. Similarly, requestors' identities may be authenticated to determine whether the requestor is authorized to receive the requested services through management system 1102. Identity management services 1104 may also control access to provider and requestor data maintained by management system 1102, such as driving and/or ride histories, personal data, or other user data. Location services 1106 may include navigation and/or traffic management services and user interfaces, or other location services.

In various embodiments, ride services 1108 may include ride matching and management services to connect a requestor to a provider. Ride services 1108 may include a user interface and or may receive data from requestors and providers through applications executing on their respective devices. Ride services 1108 may, e.g., confirm the identity of requestors and providers using identity management services 1104, and determine that each user is authorized for the requested ride service. In some embodiments, ride services 1108 can identify an appropriate provider using a location obtained from a requestor and location services 1106 to identify, e.g., a closest provider. As such, ride services 1108 can manage the distribution and allocation of provider and requestor resources, consistent with embodiments described herein.

Management system 1102 can connect to various devices through network 1110 and 1112. Networks 1110, 1112 can include any network configured to send and/or receive data communications using various communication protocols, such as AppleTalk, transmission control protocol/Internet protocol (TCP/IP), Internet packet exchange (IPX), systems network architecture (SNA), etc. In some embodiments, networks 1110, 1112 can include local area networks (LAN), such as Ethernet. Token-Ring or other LANs. Networks 1110, 1112 can include a wide-area network and/or the Internet. In some embodiments, networks 1110, 1112 can include VPNs (virtual private networks), PSTNs (a public switched telephone networks), infra-red networks, or any wireless network, including networks implementing the IEEE 802.11 family of standards, Bluetooth®, Bluetooth® Low Energy, NFC and/or any other wireless protocol. In various embodiments, networks 1110, 1112 can include a mobile network, such as a mobile telephone network, cellular network, satellite network, or other mobile network. Networks 1110, 1112 may be the same as communication network 170 in FIG. 1. In some embodiments, networks 1110, 1112 may each include a combination of networks described herein or other networks as are known to one of ordinary skill in the art.

Users may then utilize one or more services provided by management system 1102 using applications executing on provider and requestor devices. As shown in FIG. 11, provider computing devices 1114, 1116, 1118, and/or 1120 may include mobile devices (e.g., an iPhone®, an iPad®, mobile telephone, tablet computer, a personal digital assistant (PDA)), wearable devices (e.g., head mounted displays, etc.), thin client devices, gaming consoles, or other devices configured to communicate over one or more networks 1110, 1112. Each provider or requestor device can execute various operating systems (e.g., Android, iOS, etc.) and configured to communicate over the Internet, Blackberry® messenger, short message service (SMS), email, and various other messaging applications and/or communication protocols. The requestor and provider computing devices can include general purpose computers (e.g., personal computers, laptop computers, or other computing devices executing operating systems such as macOS®, Windows®, Linux®, various UNIX® or UNIX- or Linux-based operating systems, or other operating systems). In some embodiments, provider computing device 1114 can include a vehicle-integrated computing device, such as a vehicle navigation system, or other computing device integrated with the vehicle itself.

In some embodiments, provider computing device 1118 can include a provider communication device configured to communicate with users, such as drivers, passengers, pedestrians, and other users. In some embodiments, provider communication device 1118 can communicate directly with management system 1102 or through another provider computing device, such as provider computing device 1116. In some embodiments, a requestor computing device can communicate 1126 directly with provider communication device 1118 over a peer-to-peer connection, Bluetooth connection, NFC connection, ad hoc wireless network, or any other communication channel or connection. Although particular devices are shown as communicating with management system 1102 over networks 1110 and 1112, in various embodiments, management system 1102 can expose an interface, such as an application programming interface (API) or service provider interface (SPI) to enable various third parties which may serve as an intermediary between end users and management system 1102.

Although requestor/provider management environment 1100 is shown with four provider devices and two requestor devices, any number of devices may be supported. The various components shown and described herein may be implemented in hardware, firmware, software, or combinations thereof. Although one embodiment of a requestor/provider management environment is depicted in FIG. 11, this is merely one implementation and not meant to be limiting.

Figure 12:
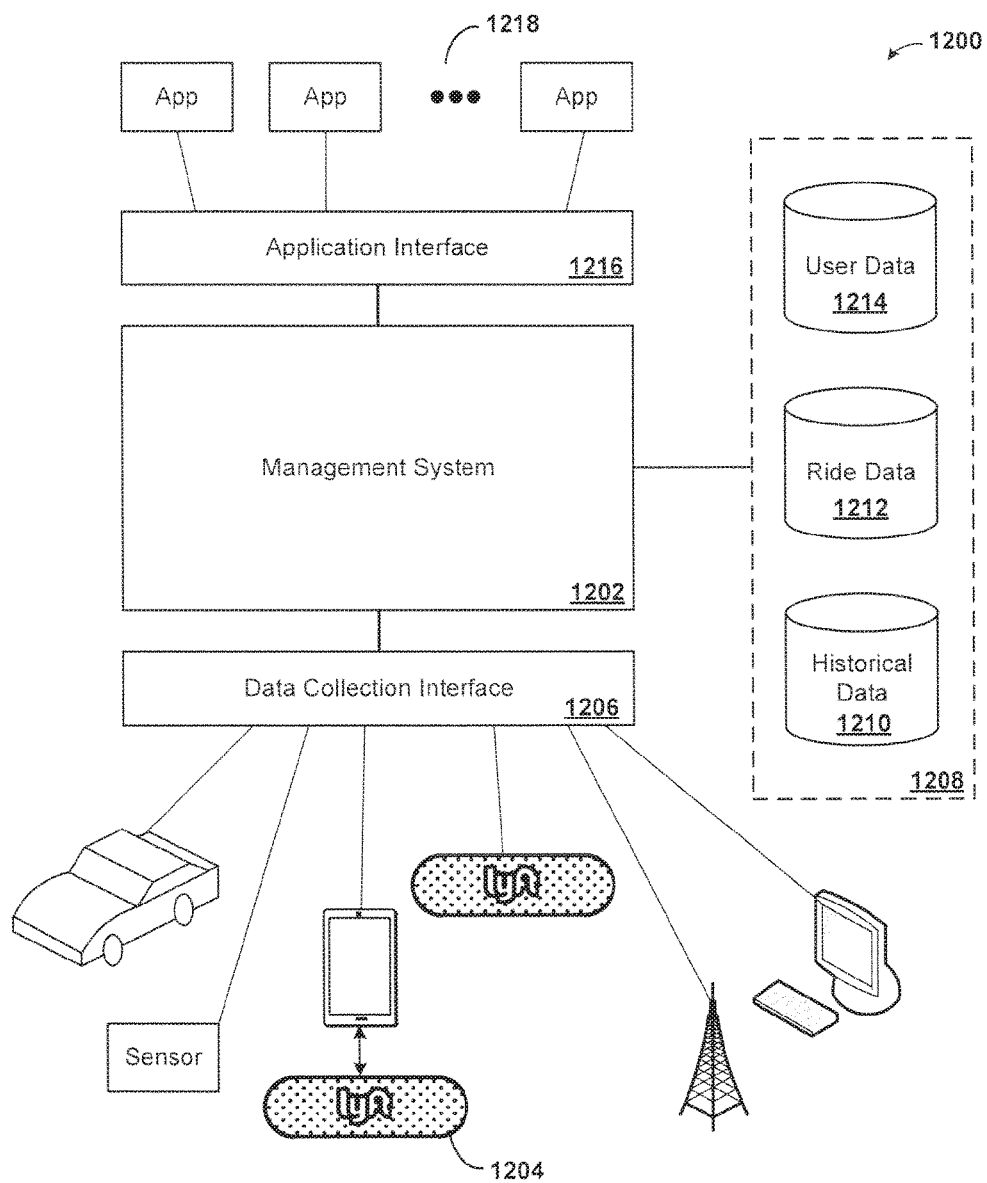
FIG. 12 illustrates an example data collection and application management system, in accordance with various embodiments.

FIG. 12 shows a data collection and application management environment 1200, in accordance with various embodiments. As shown in FIG. 12, management system 1202 may be configured to collect data from various data collection devices 1204 through a data collection interface 1206. As discussed above, management system 1202 may include one or more computers and/or servers or any combination thereof. Data collection devices 1204 may include, but are not limited to, user devices (including provider and requestor computing devices, such as those discussed above), provider communication devices, laptop or desktop computers, vehicle data (e.g., from sensors integrated into or otherwise connected to vehicles), ground-based or satellite-based sources (e.g., location data, traffic data, weather data, etc.), or other sensor data (e.g., roadway embedded sensors, traffic sensors, etc.). Data collection interface 1206 can include, e.g., an extensible device framework configured to support interfaces for each data collection device. In various embodiments, data collection interface 1206 can be extended to support new data collection devices as they are released and/or to update existing interfaces to support changes to existing data collection devices. In various embodiments, data collection devices may communicate with data collection interface 1206 over one or more networks. The networks may include any network or communication protocol as would be recognized by one of ordinary skill in the art, including those networks discussed above.

As shown in FIG. 12, data received from data collection devices 1204 can be stored in data store 1208. Data store 1208 can include one or more data stores, such as databases, object storage systems and services, cloud-based storage services, and other data stores. For example, various data stores may be implemented on a non-transitory storage medium accessible to management system 1202, such as historical data store 1210, ride data store 1212, and user data store 1214. Data stores 1208 can be local to management system 1202, or remote and accessible over a network, such as those networks discussed above or a storage-area network or other networked storage system. In various embodiments, historical data 1210 may include historical traffic data, weather data, request data, road condition data, or any other data for a given region or regions received from various data collection devices. Ride data 1212 may include route data, request data, timing data, and other ride related data, in aggregate and/or by requestor or provider. User data 1214 may include user account data, preferences, location history, and other user-specific data. Although particular data stores are shown, any data collected and/or stored according to the various embodiments described herein may be stored in data stores 1208.

As shown in FIG. 12, an application interface 1216 can be provided by management system 1202 to enable various apps 1218 to access data and/or services available through management system 1202. Apps 1218 can run on various user devices (including provider and requestor computing devices, such as those discussed above) and/or may include cloud-based or other distributed apps configured to run across various devices (e.g., computers, servers, or combinations thereof). Apps 1218 may include, e.g., aggregation and/or reporting apps which may utilize data 1208 to provide various services (e.g., third-party ride request and management apps). In various embodiments, application interface 1216 can include an API and/or SPI enabling third party development of apps 1218. In some embodiments, application interface 1216 may include a web interface, enabling web-based access to data 1208 and/or services provided by management system 1202. In various embodiments, apps 1218 may run on devices configured to communicate with application interface 1216 over one or more networks. The networks may include any network or communication protocol as would be recognized by one of ordinary skill in the art, including those networks discussed above, in accordance with an embodiment of the present disclosure.

Although a particular implementation of environment 1200 is shown in FIG. 12, this is for illustration purposes only and not intended to be limited. In some embodiments, environment 1200 may include fewer or more components, as would be recognized by one or ordinary skill in the art.

Figure 13A:
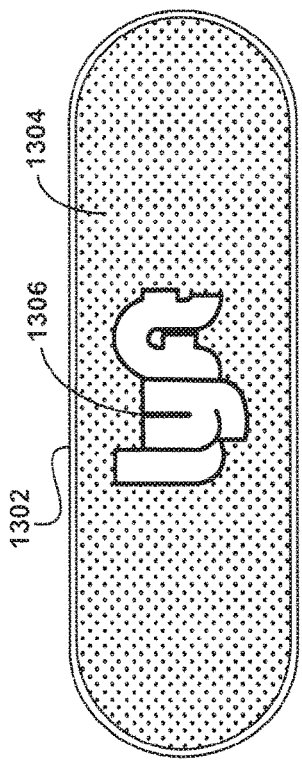
FIGS. 13A-13C illustrates an example provider communication device in accordance with various embodiments.
Figure 13B:
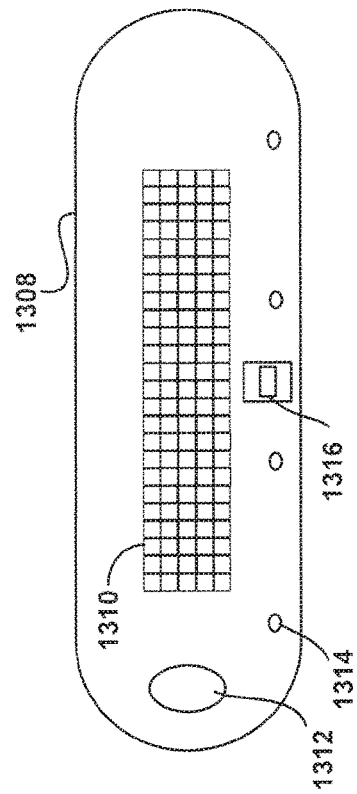
Figure 13C:
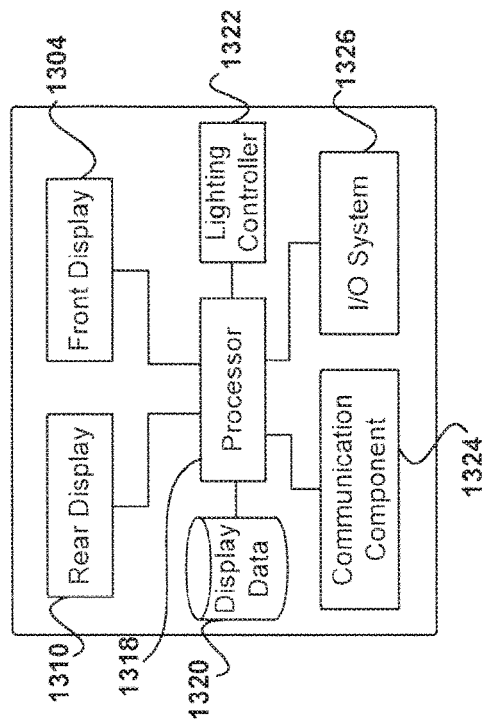

FIGS. 13A-13C show an example provider communication device 1300 in accordance with various embodiments. As shown in FIG. 13A, a front view 1302 of provider communication device 1300 shows a front display 1304. In some embodiments, front display 1304 may include a secondary region or separate display 1306. As shown in FIG. 13A, the front display may include various display technologies including, but not limited to, one or more liquid crystal displays (LCDs), one or more arrays of light emitting diodes (LEDs), or other display technologies. In some embodiments, the front display may include a cover that divides the display into multiple regions. In some embodiments, separate displays may be associated with each region. The front display 1304 can be configured to show colors, patterns, color patterns, or other identifying information to requestors and other users external to a provider vehicle. In some embodiments, the secondary region or separate display 1306 may be configured to display the same, or contrasting, information as front display 1304.

As shown in FIG. 13B, a rear view 1308 of provider communication device 1300 shows a rear display 1310. Rear display 1310, as with front display 1304, rear display 1310 may include various display technologies including, but not limited to, one or more liquid crystal displays (LCDs), one or more arrays of light emitting diodes (LEDs), or other display technologies. The rear display may be configured to display information to the provider, the requestor, or other users internal to a provider vehicle. In some embodiments, rear display 1310 may be configured to provide information to users external to the provider vehicle who are located behind the provider vehicle. As further shown in FIG. 13B, provider communication device may include a power button 1312 or other switch which can be used to turn on or off the provider communication device. In various embodiments, power button 1312 may be a hardware button or switch that physically controls whether power is provided to provider communication device 1300. Alternatively, power button 1312 may be a soft button that initiates a startup/shutdown procedure managed by software and/or firmware instructions. In some embodiments, provider communication device 1300 may not include a power button 1312. Additionally, provider communication device may include one or more light features 1314 (such as one or more LEDs or other light sources) configured to illuminate areas adjacent to the provider communication device 1300. In some embodiments, provider communication device 1300 can include a connector to enable a provider computing device to be connected to the provider communication device 1300. In some embodiments, power may be provided to the provider communication device through connector 1316.

FIG. 13C shows a block diagram of provider computing device 1300. As shown in FIG. 13C, provider communication device can include a processor 1318. Processor 1318 can control information displayed on rear display 1310 and front display 1304. As noted, each display can display information to different users, depending on the positioning of the users and the provider communication device. In some embodiments, display data 1320 can include stored display patterns, sequences, colors, text, or other data to be displayed on the front and/or rear display. In some embodiments, display data 1320 can be a buffer, storing display data as it is received from a connected provider computing device. In some embodiments, display data 1320 can include a hard disk drive, solid state drive, memory, or other storage device including information from a management system. In some embodiments, lighting controller 1322 can manage the colors and/or other lighting displayed by light features 1314. In some embodiments, communication component 1324 can manage networking or other communication between the provider communication device 1300 and one or more networking components or other computing devices. In various embodiments, communication component 1324 can be configured to communicate over Wi-Fi, Bluetooth, NFC, RF, or any other wired or wireless communication network or protocol. In some embodiments, provider communication device 1300 can include an input/output system 1326 configured to provide output in addition to that provided through the displays and/or to receive inputs from users. For example, I/O system 1326 can include an image capture device configured to recognize motion or gesture-based inputs from a user. Additionally, or alternatively, I/O system 1326 can include an audio device configured to provide audio outputs (such as alerts, instructions, or other information) to users and/or receive audio inputs, such as audio commands, which may be interpreted by a voice recognition system or other command interface. In some embodiments, I/O system may include one or more input or output ports, such as USB (universal serial bus) ports, lightning connector ports, or other ports enabling users to directly connect their devices to the provider communication device (e.g., to exchange data, verify identity information, provide power, etc.).

Figure 14:
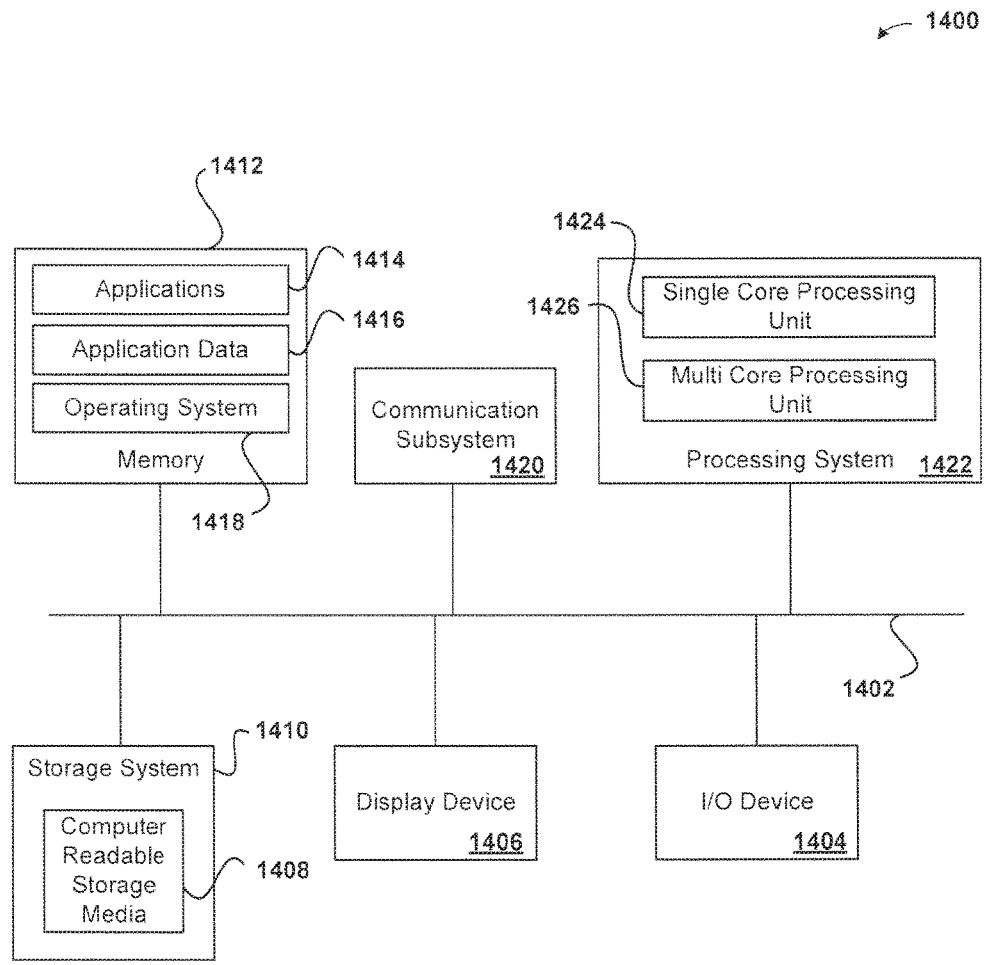
FIG. 14 illustrates an example computer system, in accordance with various embodiments.

FIG. 14 shows an example computer system 1400, in accordance with various embodiments. In various embodiments, computer system 1400 may be used to implement any of the systems, devices, or methods described herein. In some embodiments, computer system 1400 may correspond to any of the various devices described herein, including, but not limited, to mobile devices, tablet computing devices, wearable devices, personal or laptop computers, vehicle-based computing devices, or other devices or systems described herein. As shown in FIG. 14, computer system 1400 can include various subsystems connected by a bus 1402. The subsystems may include an I/O device subsystem 1404, a display device subsystem 1406, and a storage subsystem 1410 including one or more computer readable storage media 1408. The subsystems may also include a memory subsystem 1412, a communication subsystem 1420, and a processing subsystem 1422.

In system 1400, bus 1402 facilitates communication between the various subsystems. Although a single bus 1402 is shown, alternative bus configurations may also be used. Bus 1402 may include any bus or other component to facilitate such communication as is known to one of ordinary skill in the art. Examples of such bus systems may include a local bus, parallel bus, serial bus, bus network, and/or multiple bus systems coordinated by a bus controller. Bus 1402 may include one or more buses implementing various standards such as Parallel ATA, serial ATA, Industry Standard Architecture (ISA) bus, Extended ISA (EISA) bus, MicroChannel Architecture (MCA) bus, Peripheral Component Interconnect (PCI) bus, or any other architecture or standard as is known in the art.

In some embodiments, I/O device subsystem 1404 may include various input and/or output devices or interfaces for communicating with such devices. Such devices may include, without limitation, a touch screen or other touch-sensitive input device, a keyboard, a mouse, a trackball, a motion sensor or other movement-based gesture recognition device, a scroll wheel, a click wheel, a dial, a button, a switch, audio recognition devices configured to receive voice commands, microphones, image capture based devices such as eye activity monitors configured to recognize commands based on eye movement or blinking, and other types of input devices. I/O device subsystem 1404 may also include identification or authentication devices, such as fingerprint scanners, voiceprint scanners, iris scanners, or other biometric sensors or detectors. In various embodiments, I/O device subsystem may include audio output devices, such as speakers, media players, or other output devices.

Computer system 1400 may include a display device subsystem 1406. Display device subsystem may include one or more lights, such as an one or more light emitting diodes (LEDs), LED arrays, a liquid crystal display (LCD) or plasma display or other flat-screen display, a touch screen, a head-mounted display or other wearable display device, a projection device, a cathode ray tube (CRT), and any other display technology configured to visually convey information. In various embodiments, display device subsystem 1406 may include a controller and/or interface for controlling and/or communicating with an external display, such as any of the above-mentioned display technologies.

As shown in FIG. 14, system 1400 may include storage subsystem 1410 including various computer readable storage media 1408, such as hard disk drives, solid state drives (including RAM-based and/or flash-based SSDs), or other storage devices. In various embodiments, computer readable storage media 1408 can be configured to store software, including programs, code, or other instructions, that is executable by a processor to provide functionality described herein. In some embodiments, storage system 1410 may include various data stores or repositories or interface with various data stores or repositories that store data used with embodiments described herein. Such data stores may include, databases, object storage systems and services, data lakes or other data warehouse services or systems, distributed data stores, cloud-based storage systems and services, file systems, and any other data storage system or service. In some embodiments, storage system 1410 can include a media reader, card reader, or other storage interface to communicate with one or more external and/or removable storage devices. In various embodiments, computer readable storage media 1408 can include any appropriate storage medium or combination of storage media. For example, computer readable storage media 1408 can include, but is not limited to, any one or more of random access memory (RAM), read only memory (ROM), electronically erasable programmable ROM (EEPROM), flash memory or other memory technology, optical storage (e.g., CD-ROM, digital versatile disk (DVD), Blu-ray® disk or other optical storage device), magnetic storage (e.g., tape drives, cassettes, magnetic disk storage or other magnetic storage devices). In some embodiments, computer readable storage media can include data signals or any other medium through which data can be sent and/or received.

Memory subsystem 1412 can include various types of memory, including RAM, ROM, flash memory, or other memory. Memory 1412 can include SRAM (static RAM) or DRAM (dynamic RAM). In some embodiments, memory 1412 can include a BIOS (basic input/output system) or other firmware configured to manage initialization of various components during, e.g., startup. As shown in FIG. 14, memory 1412 can include applications 1414 and application data 1410. Applications 1414 may include programs, code, or other instructions, that can be executed by a processor. Applications 1414 can include various applications such as browser clients, location management applications, ride management applications, data management applications, and any other application. Application data 1416 can include any data produced and/or consumed by applications 1414. Memory 1412 can additionally include operating system 1418, such as MacOS®, Windows®, Linux®, various UNIX® or UNIX- or Linux-based operating systems, or other operating systems.

System 1400 can also include a communication subsystem 1420 configured to facilitate communication between system 1400 and various external computer systems and/or networks (such as the Internet, a local area network (LAN), a wide area network (WAN), a mobile network, or any other network). Communication subsystem 1420 can include hardware and/or software to enable communication over various wired (such as Ethernet or other wired communication technology) or wireless communication channels, such as radio transceivers to facilitate communication over wireless networks, mobile or cellular voice and/or data networks, WiFi networks, or other wireless communication networks. For example, the communication network is shown as communication network 170 in FIG. 1. Additionally, or alternatively, communication subsystem 1420 can include hardware and/or software components to communicate with satellite-based or ground-based location services, such as GPS (global positioning system). In some embodiments, communication subsystem 1420 may include, or interface with, various hardware or software sensors. The sensors may be configured to provide continuous or and/or periodic data or data streams to a computer system through communication subsystem 1420

As shown in FIG. 14, processing system 1422 can include one or more processors or other devices operable to control computing system 1400. Such processors can include single core processors 1424, multi core processors, which can include central processing units (CPUs), graphical processing units (GPUs), application specific integrated circuits (ASICs), digital signal processors (DSPs) or any other generalized or specialized microprocessor or integrated circuit. Various processors within processing system 1422, such as processors 1424 and 1426, may be used independently or in combination depending on application.

Various other configurations are may also be used, with particular elements that are depicted as being implemented in hardware may instead be implemented in software, firmware, or a combination thereof. One of ordinary skill in the art will recognize various alternatives to the specific embodiments described herein.

The specification and figures describe particular embodiments which are provided for ease of description and illustration and are not intended to be restrictive. Embodiments may be implemented to be used in various environments without departing from the spirit and scope of the disclosure.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having." "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A method comprising:
   receiving, by at least one processor of a dynamic transportation matching system, transport request information associated with a requestor computing device, the transport request information including a request location and a destination location;
   identifying, by the at least one processor of the dynamic transportation matching system, a plurality of curb segments associated with the request location;
   determining, by the at least one processor of the dynamic transportation matching system, intersection points of the plurality of curb segments;
   determining, by the at least one processor of the dynamic transportation matching system for each intersection point, one or more alternate request locations along each intersecting curb segment, each alternate request location being a threshold distance from the intersection point;
   identifying, by the at least one processor of the dynamic transportation matching system, a plurality of alternate request locations from among the one or more alternate request locations along each intersecting curb segment;
   determining, by the at least one processor of the dynamic transportation matching system, an estimated time of travel (ETT) for a requestor associated with the requestor computing device to move from the request location to each of the plurality of alternate request locations, wherein each alternate request location corresponds to a curb segment from the plurality of curb segments and the ETT for the requestor to move from the request location to each of the plurality of alternate request location is based on data associated with the requestor, including at least one of walking distance preference data, historical walking data, age, average walking speed data, elevation data, weather data, current time, or road safety data;
   determining, by the at least one processor of the dynamic transportation matching system, a matched provider based at least on a first estimated time to destination (ETD) to the destination location from the request location;
   identifying, by the at least one processor of the dynamic transportation matching system, an alternate request location from the plurality of alternate request locations based on the ETT for the alternate request location and a second ETD to the destination location from the alternate request location; and
   causing, by the at least one processor of the dynamic transportation matching system, the requestor computing device to display a user interface for a navigation route summary, the navigation route summary displaying a limited list of data related to the transport request information, comprising:
      the alternate request location from the plurality of alternate request locations;
      a selectable option to designate the alternate request location for pickup instead of the request location;
      an address identifier for the alternate request location;
      a suggested route for walking from the request location to the alternate request location;
      the ETT for the suggested route for walking from the request location to the alternate request location; and
      a difference between the first ETD to the destination location from the request location and the second ETD to the destination location from the alternate request location.

2. The method of claim 1, further comprising determining, by the at least one processor of the dynamic transportation matching system, building perimeters for each of one or more buildings associated with the request location, a layout of one or more roads associated with the request location, and widths of the one or more roads associated with the request location.

3. The method of claim 2, further comprising determining, by the at least one processor of the dynamic transportation matching system, one or more of the plurality of curb segments bordering a respective road of the one or more roads based at least on the widths of the one or more roads and the building perimeters for each of the one or more buildings.

4. The method of claim 3, further comprising storing curb segment data describing locations of the plurality of curb segments, the curb segment data identifying particular curb segments with respect to the location of the one or more buildings and the layout of the one or more roads.

5. The method of claim 1,
further comprising receiving, by the at least one processor of the dynamic transportation matching system from the requestor computing device, an indication of a selection of the selectable option to designate the alternate request location for pickup instead of the request location.

6. The method of claim 1, further comprising:
receiving, by the at least one processor of the dynamic transportation matching system, second transport request information associated with a second requestor computing device, the second transport request information including a second request location;
determining, by the at least one processor of the dynamic transportation matching system, that the alternate request location is within an area associated with the second request location;
determining, by the at least one processor of the dynamic transportation matching system, that a second ETT for a second requestor associated with the second requestor computing device to move from the second request location to the alternate request location is within a threshold amount of time of the ETT for the alternate request location; and
causing, by the at least one processor of the dynamic transportation matching system, the second requestor computing device to display an additional user interface comprising the alternate request location, an additional suggested route for walking from the second request location to the alternate request location, and an additional selectable option to designate the alternate request location for pickup instead of the second request location.

7. The method of claim 6, wherein the second transport request information includes a second destination location, the method further comprising:
determining, by the at least one processor of the dynamic transportation matching system upon receiving the second transport request information, a third ETD to the second destination location from the second request location;
determining, by the at least one processor of the dynamic transportation matching system, a plurality of alternate destination locations that are within a threshold distance of the destination location;
determining, by the at least one processor of the dynamic transportation matching system, a fourth ETD to the second destination location from each of at least one of the plurality of alternate destination locations;
determining, by the at least one processor of the dynamic transportation matching system, that the fourth ETD from an alternate destination location of the plurality of alternate destination locations is less than the third ETD; and
sending, by the at least one processor of the dynamic transportation matching system, modified transport request information including the alternate destination location to a provider computing device associated with the matched provider.

8. The method of claim 7, further comprising:
causing, by the at least one processor of the dynamic transportation matching system, the requestor computing device to display an updated user interface comprising an additional suggested route for walking from the alternate destination location to the destination location;
causing, by the at least one processor of the dynamic transportation matching system, the requestor computing device to display a third ETT for the requestor to move to the destination location from the alternate destination location; and
receiving, by the at least one processor of the dynamic transportation matching system from the requestor computing device, an indication of a selection of the alternate destination location.

9. A system comprising:
at least one processor; and
at least one non-transitory computer-readable storage medium storing instructions that, when executed by the at least one processor, cause the system to:
receive transport request information associated with a requester computing device, the transport request information including a request location and a destination location;
identify a plurality of curb segments associated with the request location;
determine intersection points of the plurality of curb segments;
determine, for each intersection point, one or more alternate request locations along each intersecting curb segment, each alternate request location being a threshold distance from the intersection point;
identify a plurality of alternate request locations from among the one or more alternate request locations along each intersecting curb segment;
determine an estimated time of travel (ETT) for a requestor associated with the requestor computing device to move from the request location to each of the plurality of alternate request locations, wherein each alternate request location corresponds to a curb segment and the ETT for the requestor to move from the request location to each of the plurality of alternate request location is based on data associated with the requestor, including at least one of walking distance preference data, historical walking data, age, average walking speed data, elevation data, weather data, current time, or road safety data;
determine a matched provider based at least on a first estimated time to destination (ETD) to the destination location from the request location;
identify an alternate request location from the plurality of alternate request locations based on the ETT for the alternate request location and a second ETD to the destination location from the alternate request location; and
cause the requestor computing device to display a user interface for a navigation route summary, the navigation route summary displaying a limited list of data related to the transport request information, comprising:
the alternate request location from the plurality of alternate request locations;
a selectable option to designate the alternate request location for pickup instead of the request location;
an address identifier for the alternate request location;
a suggested route for walking from the request location to the alternate request location;

the ETT for the suggested route for walking from the request location to the alternate request location; and a difference between the first ETD to the destination location from the request location and the second ETD to the destination location from the alternate request location.

10. The system of claim 9, further comprising instructions that, when executed by the at least one processor, cause the system to determine building perimeters for each of one or more buildings associated with the request location, a layout of one or more roads associated with the request location, and widths of the one or more roads associated with the request location.

11. The system of claim 9,
further comprising instructions that, when executed by the at least one processor, cause the system to receive, from the requestor computing device, an indication of a selection of the selectable option to designate the alternate request location for pickup instead of the request location.

12. The system of claim 9, further comprising instructions that, when executed by the at least one processor, cause the system to:
receive second transport request information associated with a second requestor computing device, the second transport request information including a second request location;
determine that the alternate request location is within an area associated with the second request location;
determine that a second ETT for a second requestor associated with the second requestor computing device to move from the second request location to the alternate request location is within a threshold amount of time of the ETT for the alternate request location; and
cause the second requestor computing device to display an additional user interface comprising the alternate request location, an additional suggested route for walking from the second request location to the alternate request location, and an additional selectable option to designate the alternate request location for pickup instead of the second request location.

13. The system of claim 12, wherein the second transport request information includes a second destination location, the system further comprising instructions that, when executed by the at least one processor, cause the system to:
determine, upon receiving the second transport request information, a third ETD to the second destination location from the second request location;
determine a plurality of alternate destination locations that are within a threshold distance of the destination location;
determine a fourth ETD to the second destination location from each of at least one of the plurality of alternate destination locations;
determine that the fourth ETD from an alternate destination location of the plurality of alternate destination locations is less than the third ETD; and
send modified transport request information including the alternate destination location to a provider computing device associated with the matched provider.

14. The system of claim 13, further comprising instructions that, when executed by the at least one processor, cause the system to:
cause the requestor computing device to display an updated user interface comprising an additional suggested route for walking from the alternate destination location to the destination location;
cause the requestor computing device to display a third ETT for the requestor to move to the destination location from the alternate destination location; and
receive, from the requestor computing device, an indication of a selection of the alternate destination location.

15. A non-transitory computer readable medium storing instructions thereon that, when executed by at least one processor, cause a computer system to:
receive transport request information associated with a requestor computing device, the transport request information including a request location and a destination location;
identify a plurality of curb segments associated with the request location;
determine intersection points of the plurality of curb segments;
determine, for each intersection point, one or more alternate request locations along each intersecting curb segment, each alternate request location being a threshold distance from the intersection point;
identify a plurality of alternate request locations from among the one or more alternate request locations along each intersecting curb segment;
determine an estimated time of travel (ETT) for a requestor associated with the requestor computing device to move from the request location to each of the plurality of alternate request locations, wherein each alternate request location corresponds to a curb segment and the ETT for the requestor to move from the request location to each of the plurality of alternate request location is based on data associated with the requestor, including at least one of walking distance preference data, historical walking data, age, average walking speed data, elevation data, weather data, current time, or road safety data;
determine a matched provider based at least on a first estimated time to destination (ETD) to the destination location from the request location;
identify an alternate request location from the plurality of alternate request locations based on the ETT for the alternate request location and a second ETD to the destination location from the alternate request location; and
cause the requestor computing device to display a user interface for a navigation route summary, the navigation route summary displaying a limited list of data related to the transport request information, comprising:
the alternate request location from the plurality of alternate request locations;
a selectable option to designate the alternate request location for pickup instead of the request location;
an address identifier for the alternate request location;
a suggested route for walking from the request location to the alternate request location;
the ETT for the suggested route for walking from the request location to the alternate request location; and
a difference between the first ETD to the destination location from the request location and the second ETD to the destination location from the alternate request location.

16. The non-transitory computer readable medium of claim 15, further comprising instructions that, when executed by the at least one processor, cause the computer system to determine building perimeters for each of one or more buildings associated with the request location, a layout of one or more roads associated with the request location, and widths of the one or more roads associated with the request location.

17. The non-transitory computer readable medium of claim 15, further comprising instructions that, when executed by the at least one processor, cause the computer system to receive, from the requestor computing device, an indication of a selection of the selectable option to designate the alternate request location for pickup instead of the request location.

18. The non-transitory computer readable medium of claim 15, further comprising instructions that, when executed by the at least one processor, cause the computer system to:
 receive second transport request information associated with a second requestor computing device, the second transport request information including a second request location;
 determine that the alternate request location is within an area associated with the second request location;
 determine that a second ETT for a second requestor associated with the second requestor computing device to move from the second request location to the alternate request location is within a threshold amount of time of the ETT for the alternate request location; and
 cause the second requestor computing device to display an additional user interface comprising the alternate request location, an additional suggested route for walking from the second request location to the alternate request location, and an additional selectable option to designate the alternate request location for pickup instead of the second request location.

19. The non-transitory computer readable medium of claim 18, wherein the second transport request information includes a second destination location, the non-transitory computer readable medium further comprising instructions that, when executed by the at least one processor, cause the computer system to:
 determine, upon receiving the second transport request information, a third ETD to the second destination location from the second request location;
 determine a plurality of alternate destination locations that are within a threshold distance of the destination location;
 determine a fourth ETD to the second destination location from each of at least one of the plurality of alternate destination locations;
 determine that the fourth ETD from an alternate destination location of the plurality of alternate destination locations is less than the third ETD; and
 send modified transport request information including the alternate destination location to a provider computing device associated with the matched provider.

20. The non-transitory computer readable medium of claim 19, further comprising instructions that, when executed by the at least one processor, cause the computer system to:
 cause the requestor computing device to display an updated user interface comprising additional suggested route for walking from the alternate destination location to the destination location;
 cause the requestor computing device to display a third ETT for the requestor to move to the destination location from the alternate destination location; and
 receive, from the requestor computing device, an indication of a selection of the alternate destination location.

* * * * *